US011265437B2

(12) United States Patent
Wakayama

(10) Patent No.: US 11,265,437 B2
(45) Date of Patent: Mar. 1, 2022

(54) LENS ARRAY UNIT, IMAGE SENSOR UNIT, IMAGE READING APPARATUS, IMAGE FORMING APPARATUS, AND METHOD OF MANUFACTURING LENS ARRAY UNIT

(71) Applicant: CANON KABUSHIKI KAISHA, Tokyo (JP)

(72) Inventor: Hiroki Wakayama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/114,255

(22) Filed: Dec. 7, 2020

(65) Prior Publication Data
US 2021/0185188 A1 Jun. 17, 2021

(30) Foreign Application Priority Data

Dec. 12, 2019 (JP) .............................. JP2019-224282

(51) Int. Cl.
*H04N 1/024* (2006.01)
*G03G 15/22* (2006.01)
(Continued)

(52) U.S. Cl.
CPC ..... *H04N 1/0249* (2013.01); *B29D 11/00298* (2013.01); *G02B 3/005* (2013.01); *G02B 3/0031* (2013.01); *G02B 3/0075* (2013.01); *G03G 15/04054* (2013.01); *G03G 15/221* (2013.01); *H04N 1/0318* (2013.01); *H04N 1/10* (2013.01);
(Continued)

(58) Field of Classification Search
CPC ...... H04N 1/0249; H04N 1/0318; H04N 1/10; H04N 2201/02452; H04N 2201/02458; H04N 2201/02466; H04N 2201/02479; H04N 2201/02481; H04N 2201/02483; B29D 11/00298; G02B 3/0031;
(Continued)

(56) References Cited

U.S. PATENT DOCUMENTS 7,256,941 B2 * 8/2007 Wu ...................... G02B 3/0031
355/20
2001/0028506 A1 * 10/2001 Fujimoto ............. H04N 1/0318
359/622
(Continued)

FOREIGN PATENT DOCUMENTS

CN 102405129 A * 4/2012 ............ B29C 33/42
JP 2017-50705 A 3/2017

*Primary Examiner* — Ryan D Walsh
(74) *Attorney, Agent, or Firm* — Canon U.S.A., Inc., IP Division

(57) ABSTRACT

A lens array unit includes a lens array including a plurality of lenses, a first side plate, and a second side plate, the first side plate and the second side plate being configured to hold the plurality of lenses therebetween, and a frame made of resin and including a first supporting portion and a second supporting portion, the first supporting portion being in contact with an outside surface of the first side plate, the second supporting portion being in contact with an outside surface of the second side plate, the first supporting portion and the second supporting portion being configured to hold the lens array therebetween and support the lens array. The outside surface of the first side plate includes a plurality of first concave portions spaced from each other in an array direction of the lenses and configured to fit with the first supporting portion.

15 Claims, 16 Drawing Sheets

(51) Int. Cl.
*B29D 11/00* (2006.01)
*H04N 1/10* (2006.01)
*G02B 3/00* (2006.01)
*G03G 15/04* (2006.01)
*H04N 1/031* (2006.01)
*B29L 11/00* (2006.01)

(52) U.S. Cl.
CPC ............. *B29L 2011/0016* (2013.01); *H04N 2201/02452* (2013.01); *H04N 2201/02458* (2013.01); *H04N 2201/02466* (2013.01); *H04N 2201/02479* (2013.01); *H04N 2201/02481* (2013.01); *H04N 2201/02483* (2013.01)

(58) Field of Classification Search
CPC ............. G02B 3/005; G02B 3/0075; G03G 15/04054; G03G 15/221; B29L 2011/0016
See application file for complete search history.

(56) References Cited

U.S. PATENT DOCUMENTS

2010/0027129 A1* 2/2010 Sato ............... H04N 1/02845
359/622
2010/0128330 A1* 5/2010 Kimura ............. H04N 1/0318
358/475

* cited by examiner

FIG.13

| IRRADIATION CONDITION | | EXAMPLE 1 | COMPARATIVE EXAMPLE 1 | EXAMPLE 2 | EXAMPLE 3 | EXAMPLE 4 | EXAMPLE 5 | COMPARATIVE EXAMPLE 2 | EXAMPLE 6 | EXAMPLE 7 | EXAMPLE 8 |
|---|---|---|---|---|---|---|---|---|---|---|---|
| OUTPUT POWER | (W) | 10 | - | 10 | 10 | 10 | 10 | 10 | 10 | 10 | 10 |
| FREQUENCY | (kHz) | 200 | - | 200 | 200 | 200 | 200 | 200 | 200 | 200 | 200 |
| NUMBER OF PRINTING OPERATIONS | | 1 | - | 1 | 1 | 1 | 1 | 1 | 1 | 1 | 1 |
| CONTOURS | | FORMED | - | FORMED | FORMED | FORMED | FORMED | FORMED | FORMED | FORMED | FORMED |
| DIAMETER | (μm) | 312 | 0 | 788 | 201 | 789 | 602 | 512 | 602 | 605 | 589 |
| DEPTH OF CONCAVE PORTION | (μm) | 404 | 0 | 153 | 398 | 106 | 399 | 458 | 194 | 406 | 243 |
| PITCH | (μm) | 600 | - | 500 | 800 | 500 | 1500 | 1000 | 500 | 2000 | 2500 |
| MACHINING TIME | (s) | 14 | 0 | 18 | 4 | 14 | 21 | 39 | 13 | 16 | 6 |
| TENSILE STRENGTH | (kg) | 8 | 0 | 12 | 2 | 8 | 16 | 30 | 8 | 10 | 3 |
| OPTICAL PERFORMANCE | | A | B | A | A | A | A | B | A | A | A |

FIG.14

| IRRADIATION CONDITION | | EXAMPLE 9 | EXAMPLE 10 |
|---|---|---|---|
| OUTPUT POWER | (W) | 10 | 10 |
| FREQUENCY | (kHz) | 200 | 200 |
| NUMBER OF PRINTING OPERATIONS | | 1 | 1 |
| CONTOURS | | FORMED | FORMED |
| SCAN SPEED | (mm/s) | 100 | 100 |
| DIAMETER | (μm) | 600 | 600 |
| DEPTH OF CONCAVE PORTION | (μm) | 250 | 250 |
| PITCH AT END PORTION | (μm) | 1500 | 1500 |
| AMOUNT OF CHANGE IN PITCH | (μm) | -5 | 0 |
| MACHINING TIME | (s) | 13 | 11 |
| TENSILE STRENGTH | (kg) | 10 | 6 |
| OPTICAL PERFORMANCE | | A | A |

FIG.15

| IRRADIATION CONDITION | | EXAMPLE 11 | EXAMPLE 12 |
|---|---|---|---|
| OUTPUT POWER | (W) | 10 | 10 |
| FREQUENCY | (kHz) | 200 | 200 |
| NUMBER OF PRINTING OPERATIONS | | 1 | 1 |
| CONTOURS | | FORMED | FORMED |
| SCAN SPEED | (mm/s) | 100 | 400 |
| DIAMETER | ($\mu$m) | 600 | 600 |
| DEPTH OF CONCAVE PORTION AT END PORTION | ($\mu$m) | 100 | 100 |
| AMOUNT OF CHANGE IN DEPTH | ($\mu$m) | -2.5 | 0 |
| PITCH | ($\mu$m) | 1000 | 1000 |
| MACHINING TIME | (s) | 13 | 4 |
| TENSILE STRENGTH | (kg) | 10 | 3 |
| OPTICAL PERFORMANCE | | A | A |

FIG.16

| IRRADIATION CONDITION | | EXAMPLE 13 | EXAMPLE 14 |
|---|---|---|---|
| OUTPUT POWER | (W) | 10 | 10 |
| FREQUENCY | (kHz) | 200 | 200 |
| NUMBER OF PRINTING OPERATIONS | | 1 | 1 |
| CONTOURS | | FORMED | FORMED |
| SCAN SPEED | (mm/s) | 100 | 400 |
| DIAMETER | (μm) | 600 | 600 |
| DEPTH OF CONCAVE PORTION AT END PORTION | (μm) | 100 | 100 |
| AMOUNT OF CHANGE IN DEPTH | (μm) | -2.5 | 0 |
| PITCH AT END PORTION | (μm) | 1500 | 1500 |
| AMOUNT OF CHANGE IN PITCH | (μm) | -5 | 0 |
| MACHINING TIME | (s) | 11 | 3 |
| TENSILE STRENGTH | (kg) | 10 | 2 |
| OPTICAL PERFORMANCE | | A | A |

LENS ARRAY UNIT, IMAGE SENSOR UNIT, IMAGE READING APPARATUS, IMAGE FORMING APPARATUS, AND METHOD OF MANUFACTURING LENS ARRAY UNIT

BACKGROUND OF THE INVENTION

Field of the Invention

The present disclosure relates to a lens array unit, an image sensor unit, an image reading apparatus, an image forming apparatus, and a method of manufacturing the lens array unit.

Description of the Related Art

An image sensor unit used in an image reading apparatus, such as a facsimile or a scanner, includes an image sensor, a lens array that focuses light from an object to be read and forms an image on the image sensor, and a frame that supports the image sensor and the lens array.

The lens array described in Japanese Patent Application Publication No. 2017-50705 is inserted into an opening formed in a frame, and fixed to the frame. The lens array is fixed to the frame by using adhesive such as UV curing agent such that the lens array is not separated from the frame when used, and that a gap is not formed between the lens array and the frame.

However, if the adhesive is used to fix the lens array to the frame, the material cost will increase by the cost of the adhesive.

SUMMARY OF THE INVENTION

According to a first aspect of the present disclosure, a lens array unit includes a lens array including a plurality of lenses, a first side plate, and a second side plate, the plurality of lenses being arrayed in an array direction, the first side plate and the second side plate being configured to hold the plurality of lenses therebetween, and a frame made of resin and including a first supporting portion and a second supporting portion, the first supporting portion being in contact with an outside surface of the first side plate, the second supporting portion being in contact with an outside surface of the second side plate, the first supporting portion and the second supporting portion being configured to hold the lens array therebetween and support the lens array. The outside surface of the first side plate includes a plurality of first concave portions spaced from each other in the array direction and configured to fit with the first supporting portion.

According to a second aspect of the present disclosure, a method of manufacturing a lens array unit, the method includes forming a lens array including a plurality of lenses, a first side plate, and a second side plate, the plurality of lenses being arrayed in an array direction, the first side plate and the second side plate being configured to hold the plurality of lenses therebetween, and forming a frame by setting the lens array in a mold and injecting resin material into the mold, the frame including a first supporting portion and a second supporting portion, the first supporting portion being in contact with an outside surface of the first side plate, the second supporting portion being in contact with an outside surface of the second side plate, the first supporting portion and the second supporting portion being configured to hold the lens array therebetween and support the lens array. The forming of the lens array includes forming a plurality of first concave portions in the outside surface of the first side plate, with the plurality of first concave portions being spaced from each other in the array direction. The forming of the frame includes forming the first supporting portion such that the first supporting portion fits in the plurality of first concave portions.

Further features of the present disclosure will become apparent from the following description of exemplary embodiments with reference to the attached drawings.

BRIEF DESCRIPTION OF THE DRAWINGS

FIG. 13 is a diagram illustrating measurement results in examples.

FIG. 14 is a diagram illustrating measurement results in examples.

FIG. 15 is a diagram illustrating measurement results in examples.

FIG. 16 is a diagram illustrating measurement results in examples.

DESCRIPTION OF THE EMBODIMENTS

Hereinafter, some embodiments of the present disclosure will be described in detail with reference to the accompanying drawings.

First Embodiment

Figure 1A:
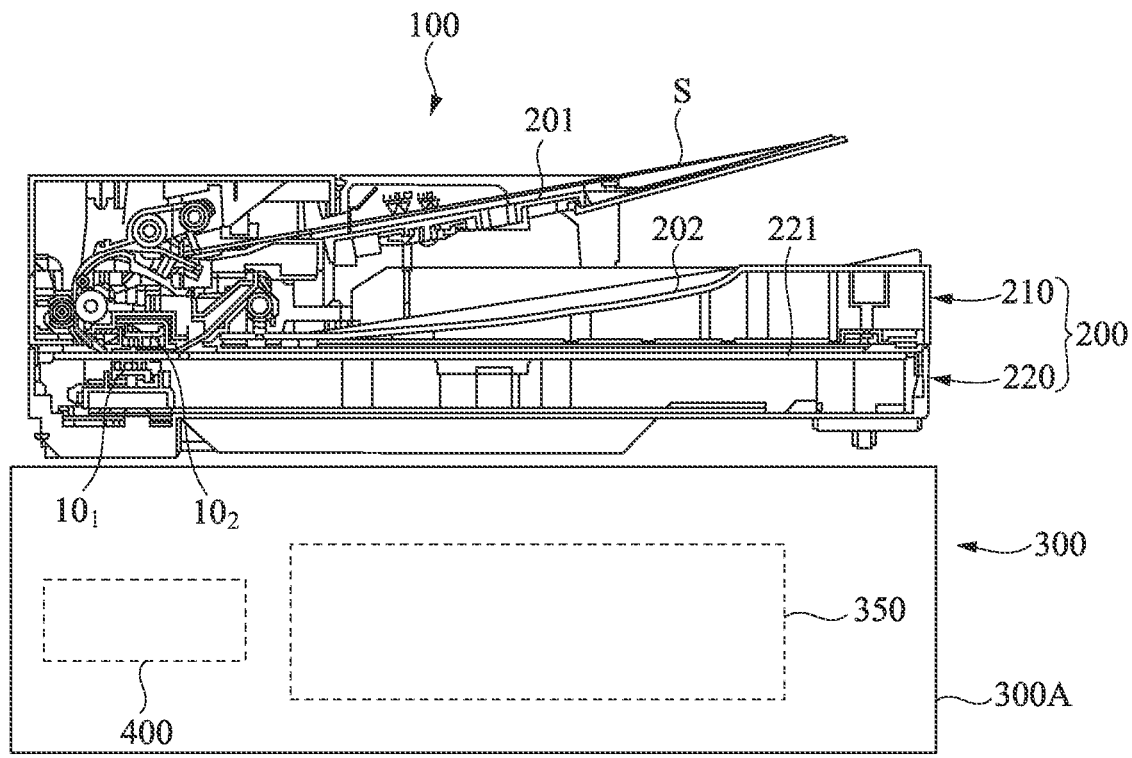
FIG. 1A is a diagram illustrating a printer that is one example of an image forming apparatus of a first embodiment.

FIG. 1A is a diagram illustrating a printer 100 that is one example of an image forming apparatus of a first embodiment. The printer 100 is an electrophotographic laser beam printer. The printer 100 includes a printer body 300 and an image reading apparatus 200 disposed on a top of the printer body 300. The printer body 300 includes a housing 300A and an image forming engine 350. The image forming engine 350 is disposed in the housing 300A, and is one example of an image forming portion that forms an image on a sheet. The sheet is a recording material that may be a paper sheet, such as a plain paper sheet, a specialized paper sheet (e.g. coated paper sheet), an envelope, or an index paper sheet, a plastic film used for overhead projectors, or a cloth sheet.

Figure 1B:
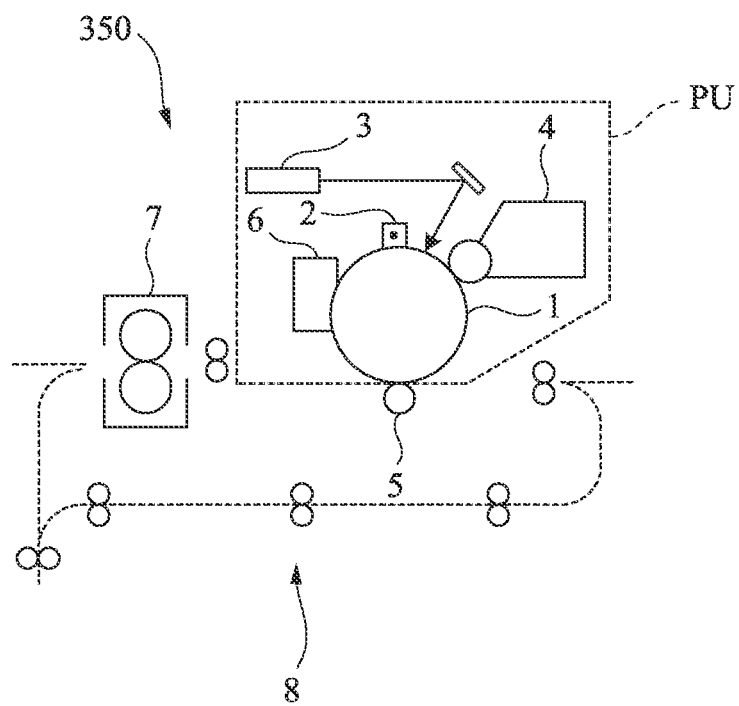
FIG. 1B is a diagram illustrating an image forming engine of the first embodiment.

FIG. 1B is a diagram illustrating the image forming engine 350 of the first embodiment. As illustrated in FIG. 1B, the image forming engine 350 includes an electrophotographic image forming unit PU and a fixing apparatus 7. When a start of an image forming operation is instructed, a photosensitive drum 1 that is a photosensitive member is rotated, and the surface of the photosensitive drum 1 is uniformly charged by a charging apparatus 2. Then an exposure apparatus 3 modulates a laser beam in accordance with image data, sent by the image reading apparatus 200 or an external computer; outputs the modulated laser beam; and scans the surface of the photosensitive drum 1 and forms an electrostatic latent image on the surface of the photosensitive drum 1. The electrostatic latent image is then developed into a toner image, with the toner supplied from a developing apparatus 4.

In parallel with such an image forming operation, a feeding operation is performed for feeding a sheet stacked on a cassette or a manual feed tray (both not illustrated) toward the image forming engine 350. The sheet is conveyed in synchronization with the image formation operation performed by the image forming unit PU. The toner image borne by the photosensitive drum 1 is transferred onto the sheet by a transfer roller 5. The toner left on the photosensitive drum 1 after the toner image has been transferred is collected by a cleaning apparatus 6. The sheet onto which the toner image has been transferred is delivered to the fixing apparatus 7, and heated and pressed by a roller pair while nipped by the roller pair. The toner is melted, solidified, and fixed to the sheet; and the sheet is discharged to the outside of the housing 300A by a discharging roller pair. When duplex printing is performed, the sheet is conveyed by a reverse-and-conveyance portion 8 in a state where the sheet is reversed, then an image is formed on a back side of the sheet by the image forming engine 350, and then the sheet is discharged to the outside of the housing 300A.

The printer body 300 also includes a control unit 400. The control unit 400 includes a central processing unit (CPU) and memories. The CPU controls the whole of the printer 100, and the memories store a program executed by the CPU, image information data, and setting information data. The control unit 400 performs an image forming operation that controls the image forming engine 350 and causes the image forming engine 350 to form an image on a sheet, which is a recording medium.

Note that since the image forming engine 350 is one example of an image forming unit that forms an image on a sheet serving as a recording medium, the image forming engine 350 may not be the above-described direct transfer system. For example, the image forming engine 350 may be an intermediate transfer system including an intermediate transfer member, or may be another mechanism such as an ink-jet system.

Next, the image reading apparatus 200 will be described. The image reading apparatus 200 includes an auto document feeder (ADF) 210 and a scanner unit 220. The ADF 210 automatically feeds a document S placed on a document tray 201. The scanner unit 220 includes a document platen 221. For example, the document platen 221 is made of glass for transmitting light. The ADF 210 can be opened with respect to the scanner unit 220 for exposing the document platen 221. The sheet used as the document S may be a blank sheet or a sheet having an image formed on a single side or both sides.

The ADF 210 includes an image sensor unit $10_2$ that can read image information from the document S, and the scanner unit 220 includes an image sensor unit $10_1$ that can read image information from the document S. The image sensor units $10_1$ and $10_2$ emit light to two surfaces of the document S, and receive light reflected from the two surfaces of the document S and read the image information.

Next, an operation to read the image information from the document S while the document S is fed by the ADF 210 will be described. First, the document S is placed on the document tray 201 by an operator. When the operator uses an operation unit (not illustrated) and instructs the image reading apparatus to start a reading operation, the ADF 210 conveys the document S toward a reading position at which the image sensor units $10_1$ and $10_2$ read the image information.

After that, the image sensor units $10_1$ and $10_2$ start to read the image information at a predetermined timing. The image sensor unit $10_1$ disposed in the scanner unit 220 reads the image information from a first surface (front surface) of the document S, and the image sensor unit $10_2$ disposed in the ADF 210 reads the image information from a second surface (back surface) of the document S opposite to the first surface. The document S having passed the reading position of the image sensor units $10_1$ and $10_2$ is discharged to a discharging tray 202.

In addition, the image reading apparatus 200 can perform an operation that reads image information from a document placed on the document platen 221 of the scanner unit 220. In this case, the image information is read from the document by the image sensor unit $10_1$ moving in a sub-scanning direction (right and left direction in FIG. 1A) along the document platen 221 while the document is placed on the document platen 221 so as not to move.

Figure 2:
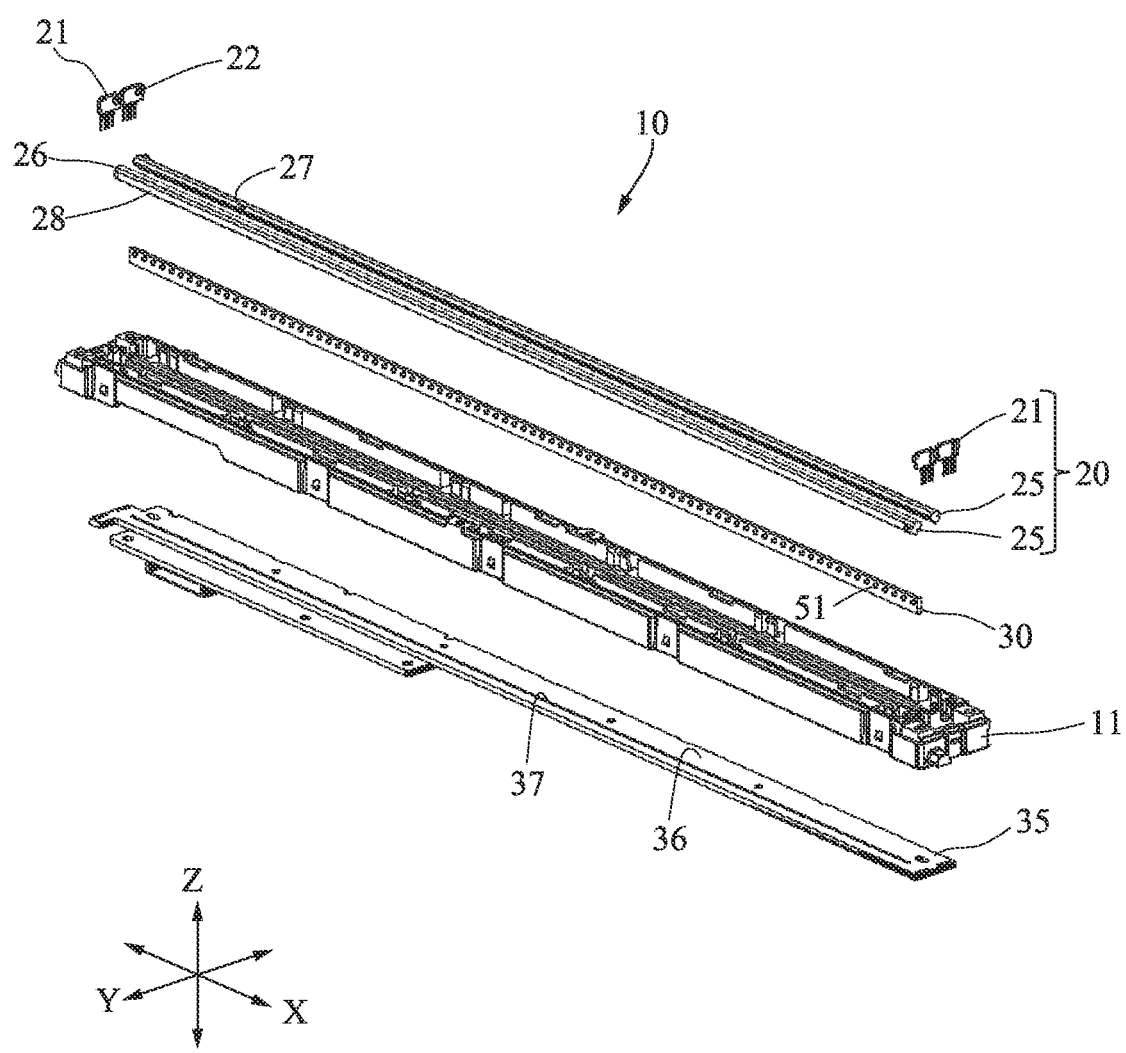
FIG. 2 is an exploded perspective view of an image sensor unit of the first embodiment.

The image sensor units $10_1$ and $10_2$ have an identical configuration. Hereinafter, the configuration of the image sensor units $10_1$ and $10_2$ will be described. FIG. 2 is an exploded perspective view of the image sensor unit of the first embodiment. An image sensor unit 10 illustrated in FIG. 2 is the same as each of the image sensor units $10_1$ and $10_2$ illustrated in FIG. 1A.

Note that although the description has been made for the case where the image reading apparatus 200 includes the ADF 210, the image reading apparatus 200 may not include the ADF 210. In this case, the image reading apparatus 200 includes the image sensor unit $10_1$ alone, and does not include the image sensor unit $10_2$. Thus, the image sensor unit 10 illustrated in FIG. 2 is the image sensor unit $10_1$.

As illustrated in FIG. 2, an X direction, a Y direction, and a Z direction are directions orthogonal to each other in three dimensions. The X direction is a main scanning direction, the Y direction is a sub-scanning direction orthogonal to the main scanning direction, and the Z direction is orthogonal to the X direction and the Y direction.

The image sensor unit 10 is formed like a rectangular parallelepiped. A longitudinal direction of the image sensor unit 10 is equal to the main scanning direction. The image sensor unit 10 includes a frame 11, a light-source unit 20, a lens array 30, a wiring board 35, and an image sensor 37. These members have a length corresponding to the width of a document (to be read) in the X direction.

The frame 11 is a supporting member having a space in which each component of the image sensor unit 10 is accommodated. The frame 11 is formed like a rectangular parallelepiped that extends in the X direction. The frame 11 has concave and convex portions for supporting components including the light-source unit 20, the wiring board 35, and the lens array 30.

The light-source unit 20 emits light to a document. The light is shaped like a line in the X direction, which is the main scanning direction. The light-source unit 20 includes a pair of light guide members 25 and a pair of light sources 21. The light guide members 25 are spaced from each other in the Y direction, and extend in the X direction. The light sources 21 are disposed at both ends of the light guide members 25 in the X direction. Each of the light sources 21 is an LED module that includes a plurality of LED chips 22, which are light emitting devices. The plurality of LED chips 22 is covered with transparent resin. For example, the LED chips 22 emit light having a wavelength of red, green, blue, infrared, or ultraviolet light.

Each of the light guide members 25 emits light sent from the light sources 21, toward a document. Each of the light guide members 25 is made of acrylic transparent resin, and is formed like a long bar and extends in the X direction. Each of the light guide members 25 includes a light-incident surface 26 formed at an end portion of the light guide member in the X direction. The incident surface 26 is parallel with a YZ plane orthogonal to the X direction, and light from a corresponding light source 21 enters the incident surface 26. In addition, each of the light guide members 25 includes an emitting surface 27 that faces a document. The emitting surface 27 emits light that has traveled in the light guide member 25, toward the document. In addition, each of the light guide members 25 includes a reflecting surface 28 that is formed opposite to the emitting surface 27. The reflecting surface 28 causes the light having entered the incident surface 26 to travel in the X direction, and reflects the light toward the emitting surface 27.

The wiring board 35 is a printed wiring board formed like a flat plate, and extends in the X direction. A mounting surface 36 of the wiring board 35 is parallel with an XY plane orthogonal to the Z direction. On the mounting surface 36 of the wiring board 35, the image sensor 37 and a driving circuit (not illustrated) are mounted. The driving circuit causes the light sources 21 to emit light, and drives the image sensor 37.

The lens array 30 is an optical member that focuses the light from a document and forms an image on the image sensor 37. The light-source unit 20 is disposed on one side with respect to the lens array 30 in the Z direction, and the image sensor 37 is disposed on the other side with respect to the lens array 30 in the Z direction. That is, the lens array 30 is disposed between the light-source unit 20 and the image sensor 37.

The image sensor 37 receives light that is reflected from a document and focused by the lens array 30, and converts the light to an electrical signal. The image sensor 37 includes a plurality of image sensor ICs. Each of the image sensor ICs includes a plurality of photoelectric conversion elements. The number of the image sensor ICs and the number of the photoelectric conversion elements of each of the image sensor ICs depend on the resolution used for reading a document. The plurality of image sensor ICs is arrayed on the mounting surface 36 linearly in the X direction. Note that the image sensor 37 is not limited to the above-described configuration as long as the image sensor 37 can convert the light reflected from a document, to an electrical signal.

Figure 3A:
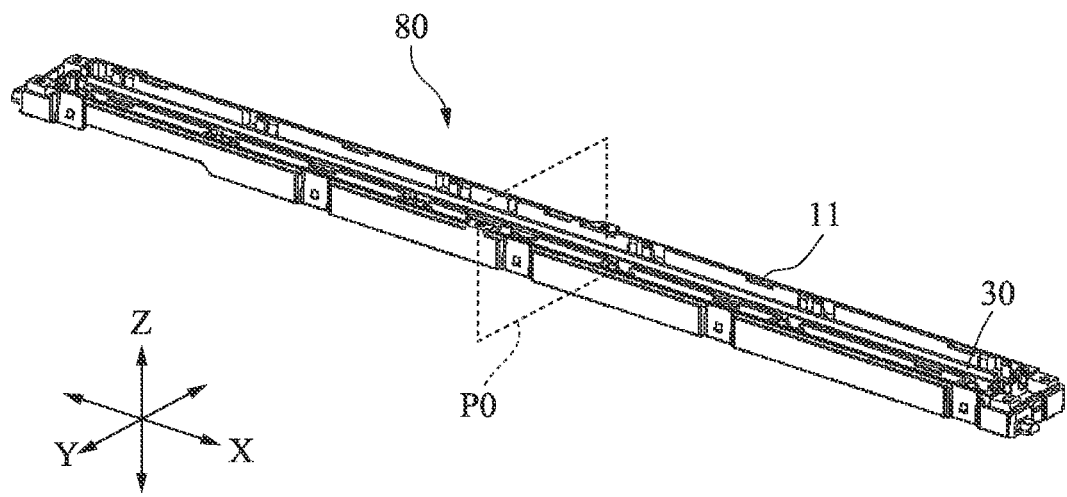
FIG. 3A is a perspective view of a lens array unit of the first embodiment.
Figure 3B:
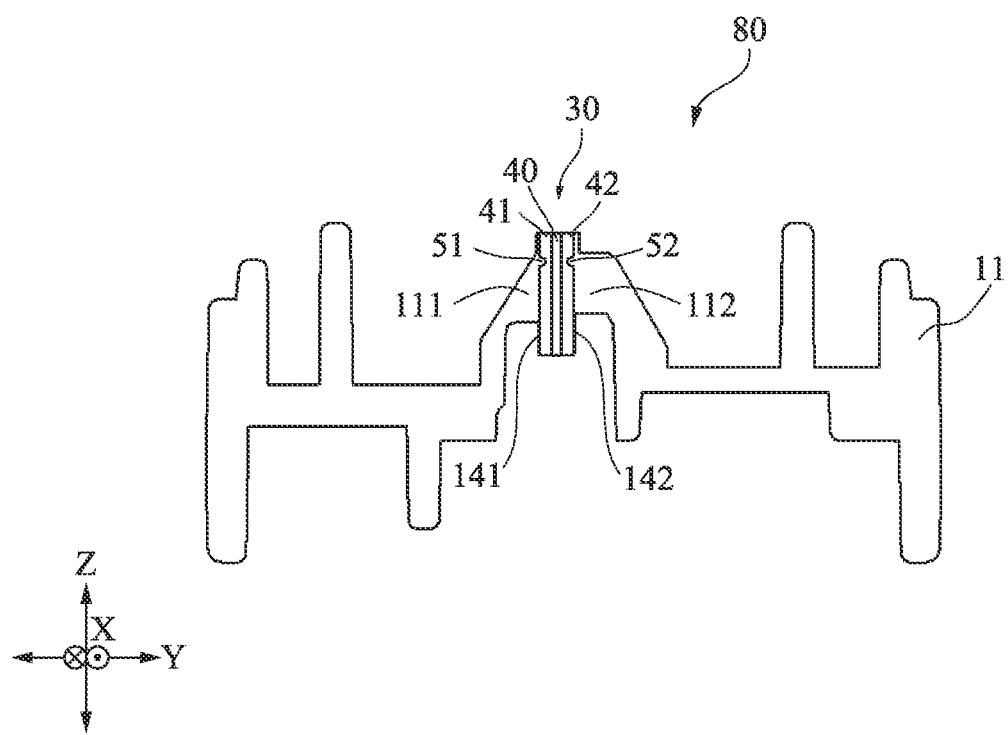
FIG. 3B is a cross-sectional view of the lens array unit of the first embodiment.
Figure 4A:
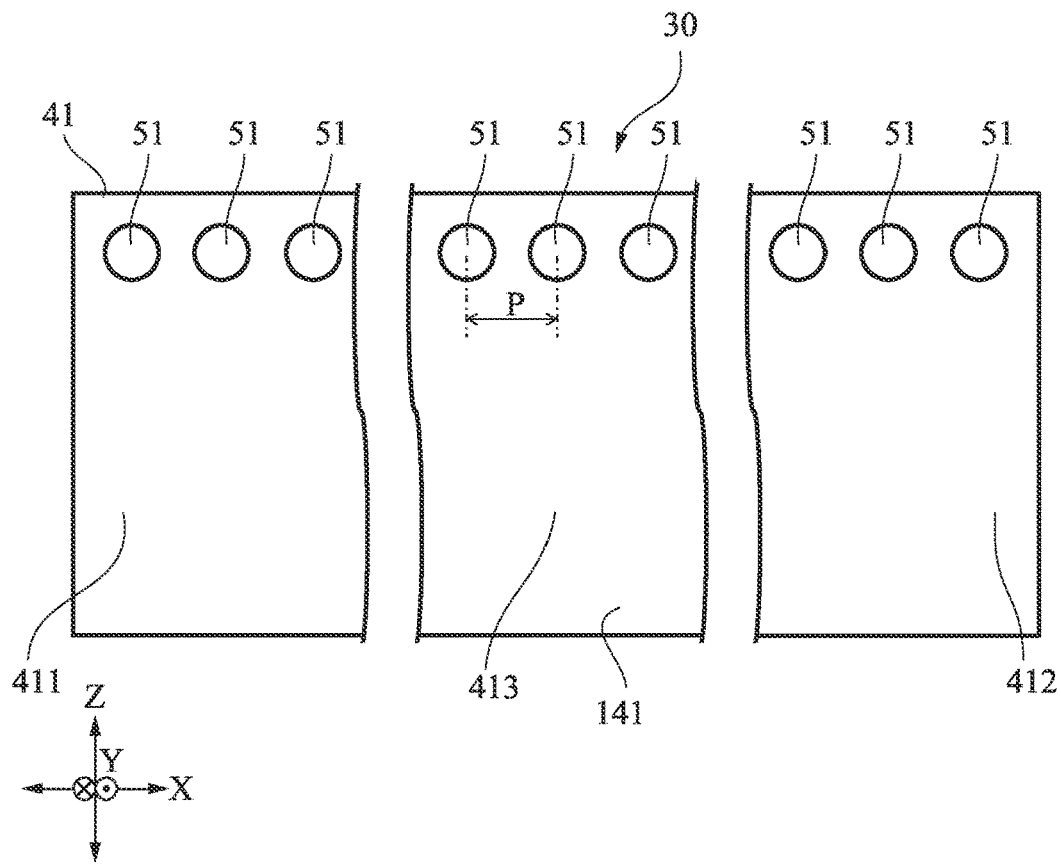
FIG. 4A is a side view of a lens array of the first embodiment.
Figure 4B:
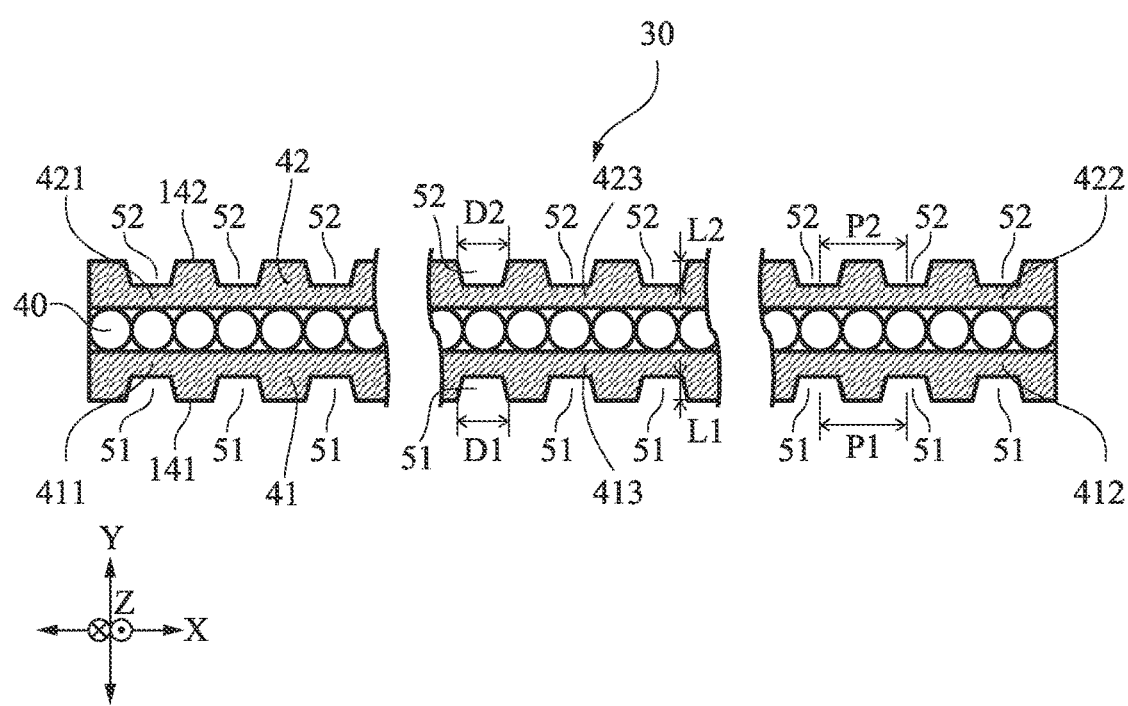
FIG. 4B is a sectional view of the lens array of the first embodiment.
Figure 5:
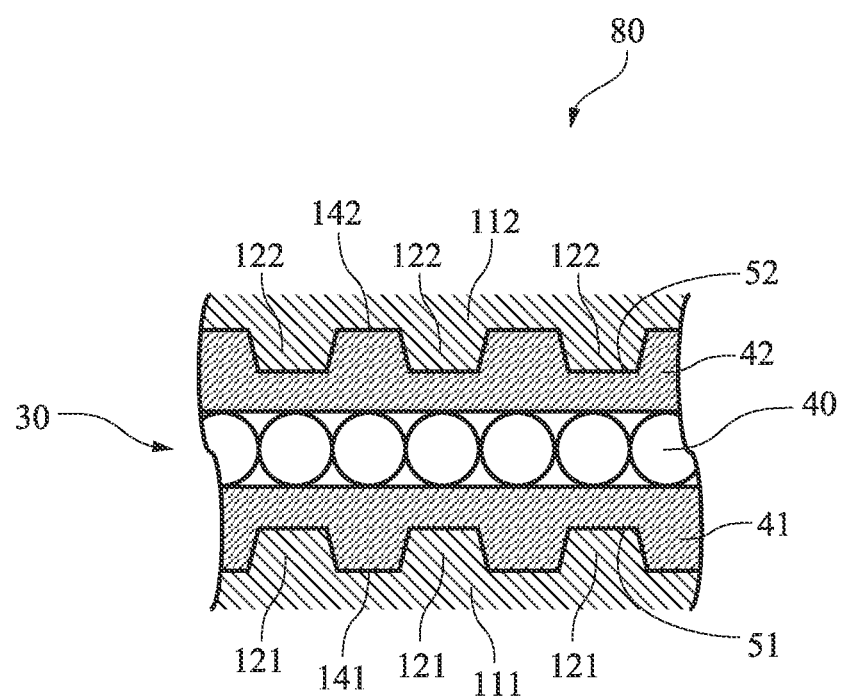
FIG. 5 is a partial sectional view of the lens array unit of the first embodiment.

FIG. 3A is a perspective view of a lens array unit 80. The lens array unit 80 is an object in which the lens array 30 and the frame 11 are joined with each other as one body. FIG. 3B is a cross-sectional view of the lens array unit 80, taken along an imaginary plane P0 illustrated in FIG. 3A and parallel with the YZ plane. FIG. 4A is a side view of the lens array 30 of the first embodiment, and FIG. 4B is a sectional view of the lens array 30 of the first embodiment. FIG. 5 is a partial sectional view of the lens array unit 80.

In the first embodiment, the lens array 30 and the frame 11 illustrated in FIG. 3A are formed as one body through insert molding. As illustrated in FIG. 3B, the frame 11 includes a pair of supporting portions 111 and 112 that holds and supports the lens array 30. The supporting portion 111 is a first supporting portion, and the supporting portion 112 is a second supporting portion.

As illustrated in FIG. 4B, the lens array 30 includes a plurality of lenses 40 arrayed in the X direction, which is an array direction. Each of the lenses 40 is a rod lens that extends in the Z direction. The light-source unit 20 illustrated in FIG. 2 is disposed on one side with respect to the lenses 40 in the Z direction that is a longitudinal direction of the lenses 40, and the image sensor 37 is disposed on the other side with respect to the lenses 40 in the Z direction.

As illustrated in FIGS. 3B and 4B, the lens array 30 includes two side plates 41 and 42 that hold the plurality of lenses 40 therebetween in the Y direction. The plurality of lenses 40 and the pair of side plates 41 and 42 are fixed to each other via adhesive, and formed as one body. The side plate 41 is a first side plate, and the side plate 42 is a second side plate. The supporting portion 111 is in contact with part or all of an outside surface 141 of the side plate 41. The supporting portion 112 is in contact with part or all of an outside surface 142 of the side plate 42. The outside surface 141 is a first outside surface, and the outside surface 142 is a second outside surface. In the first embodiment, the supporting portion 111 is in contact with part of the outside surface 141, and the supporting portion 112 is in contact with part of the outside surface 142. Since both edge surfaces of the lens array 30 in the Z direction are a light-incident surface and a light-emitting surface, the edge surfaces are exposed to the outside, without being covered with the frame 11.

The side plate 41 includes a plurality of concave portions 51 formed in the outside surface 141 and spaced from each other in the X direction. The side plate 42 includes a plurality of concave portions 52 formed in the outside surface 142 and spaced from each other in the X direction. Each of the plurality of concave portions 51 is a first concave portion. Each of the plurality of concave portions 52 is a second concave portion. In the first embodiment, the plurality of concave portions 51 is arranged in a single line in the X direction, and the plurality of concave portions 52 is arranged in a single line in the X direction.

As illustrated in FIG. 5, the supporting portion 111 is in contact with an area of the outside surface 141 of the side plate 41, and the area includes a portion of the outside surface 141 in which the plurality of concave portions 51 is formed. The supporting portion 112 is in contact with an area of the outside surface 142 of the side plate 42, and the area includes a portion of the outside surface 142 in which the plurality of concave portions 52 is formed. That is, the supporting portion 111 is formed so as to fit in the plurality of concave portions 51. In addition, the supporting portion 112 is formed so as to fit in the plurality of concave portions 52. Specifically, the supporting portion 111 includes a plurality of convex portions 121 that fit in the plurality of concave portions 51, and the supporting portion 112 includes a plurality of convex portions 122 that fit in the plurality of concave portions 52. In the first embodiment, the lens array 30 and the frame 11 are formed as one body through insert molding. Thus, the outside surface 141 and the supporting portion 111 are firmly in contact with each other in a state where the plurality of convex portions 121 of the supporting portion 111 fit in the plurality of concave portions 51 of the outside surface 141. Similarly, the outside surface 142 and the supporting portion 112 are firmly in contact with each other in a state where the plurality of convex portions 122 of the supporting portion 112 fit in the plurality of concave portions 52 of the outside surface 142. With this structure, the joint strength between the supporting portion 111 and the side plate 41 is increased, and the supporting portion 111 is prevented from being separated from the outside surface 141 of the side plate 41 even if impact is applied to the frame 11. Similarly, the joint strength between the supporting portion 112 and the side plate 42 is increased, and the supporting portion 112 is prevented from being separated from the outside surface 142 of the side plate 42 even if impact is applied to the frame 11.

In a side view of the lens array 30, that is, when the lens array 30 is viewed in the Y direction, each concave portion 51 is formed like a dot or circle, and each concave portion 52 is formed like a dot or circle. Note that the shape of the concave portions 51 and 52 viewed in the Y direction is not limited to a circle. For example, the shape of the concave portions 51 and 52 viewed in the Y direction may be any shape, such as an elliptical shape or a long-hole shape. Suitably, the shape of the concave portions 51 and 52 is a dot shape for ensuring sufficient joint strength. In addition, each concave portion 51 is preferably a bottomed hole for ensuring sufficient optical performance of each of the lenses 40. Similarly, each concave portion 52 is preferably a bottomed hole.

The stress caused by impact applied to the frame 11 is larger in a center portion 413 of the side plate 41 in the X direction, than in end portions 411 and 412 of the side plate 41 in the X direction. Thus, some of the plurality of concave portions 51 are preferably formed in the center portion 413 of the side plate 41 in the X direction. Similarly, the stress caused by impact applied to the frame 11 is larger in a center portion 423 of the side plate 42 in the X direction, than in end portions 421 and 422 of the side plate 42 in the X direction. Thus, some of the plurality of concave portions 52 are preferably formed in the center portion 423 of the side plate 42 in the X direction.

In addition, the stress caused by impact applied to the frame 11 disperses throughout the side plate 41 in the X direction, and throughout the side plate 42 in the X direction. Thus, the plurality of concave portions 51 are preferably formed from the one end portion 411 to the other end portion 412 of the side plate 41 in the X direction. Similarly, the plurality of concave portions 52 are preferably formed from the one end portion 421 to the other end portion 422 of the side plate 42 in the X direction.

A diameter D1 of each of the plurality of concave portions 51 is preferably equal to or larger than 100 µm and equal to or smaller than 1000 µm, and more preferably, is equal to or larger than 300 µm and equal to or smaller than 800 µm. Similarly, a diameter D2 of each of the plurality of concave portions 52 is preferably equal to or larger than 100 µm and equal to or smaller than 1000 µm, and more preferably, is equal to or larger than 300 µm and equal to or smaller than 800 µm.

A depth L1 of each of the plurality of concave portions 51 in the Y direction is preferably equal to or larger than 50 µm and equal to or smaller than 400 µm, and more preferably, is equal to or larger than 100 µm and equal to or smaller than 300 µm. Similarly, a depth L2 of each of the plurality of concave portions 52 in the Y direction is preferably equal to or larger than 50 µm and equal to or smaller than 400 µm, and more preferably, is equal to or larger than 100 µm and equal to or smaller than 300 µm.

A pitch P1 of a pair of adjacent ones of the plurality of concave portions 51 is preferably equal to or larger than 300 µm and equal to or smaller than 3000 µm, and more preferably, is equal to or larger than 500 µm and equal to or smaller than 2000 µm. Note that the pitch P1 of a pair of adjacent ones of the plurality of concave portions 51 is a distance between the center of one of the pair and the center of the other of the pair. Similarly, a pitch P2 of a pair of adjacent ones of the plurality of concave portions 52 is preferably equal to or larger than 300 µm and equal to or smaller than 3000 µm, and more preferably, is equal to or larger than 500 µm and equal to or smaller than 2000 µm. Note that the pitch P2 of a pair of adjacent ones of the plurality of concave portions 52 is a distance between the center of one of the pair and the center of the other of the pair.

The plurality of concave portions 51 is arrayed in the X direction at the constant pitch P1. The plurality of concave portions 52 is arrayed in the X direction at the constant pitch P2. In addition, the plurality of concave portions 51 has the identical depth L1 in the Y direction. Similarly, the plurality of concave portions 52 has the identical depth L2 in the Y direction.

If the diameter of each of the concave portions 51 is equal to or larger than 100 µm and equal to or smaller than 1000 µm, and the depth of each of the concave portions 51 is equal to or larger than 50 µm and equal to or smaller than 400 µm, and the pitch of a pair of adjacent ones of the plurality of concave portions 51 is equal to or larger than 300 µm and equal to or smaller than 3000 µm, the optical property and the joint strength between the lens array 30 and the frame 11 can be further increased. Similarly, if the diameter of each of the concave portions 52 is equal to or larger than 100 µm and equal to or smaller than 1000 µm, and the depth of each of the concave portions 52 is equal to or larger than 50 µm and equal to or smaller than 400 µm, and the pitch of a pair of adjacent ones of the plurality of concave portions 52 is equal to or larger than 300 µm and equal to or smaller than 3000 µm, the optical property and the joint strength between the lens array 30 and the frame 11 can be further increased.

Next, each process in a method of manufacturing the image sensor unit 10 will be described.

First Process

In a first process, the lens array 30 illustrated in FIGS. 4A and 4B is formed. In the first embodiment, the lens array 30 is formed by preparing a lens array in which the concave portions 51 and 52 are not formed, and by forming the concave portions 51 and 52 in the lens array. The concave portions 51 and 52 may be formed through cutting, drilling, grinding, or laser machining, but preferably, through laser machining for shortening the machining time.

Figure 6A:
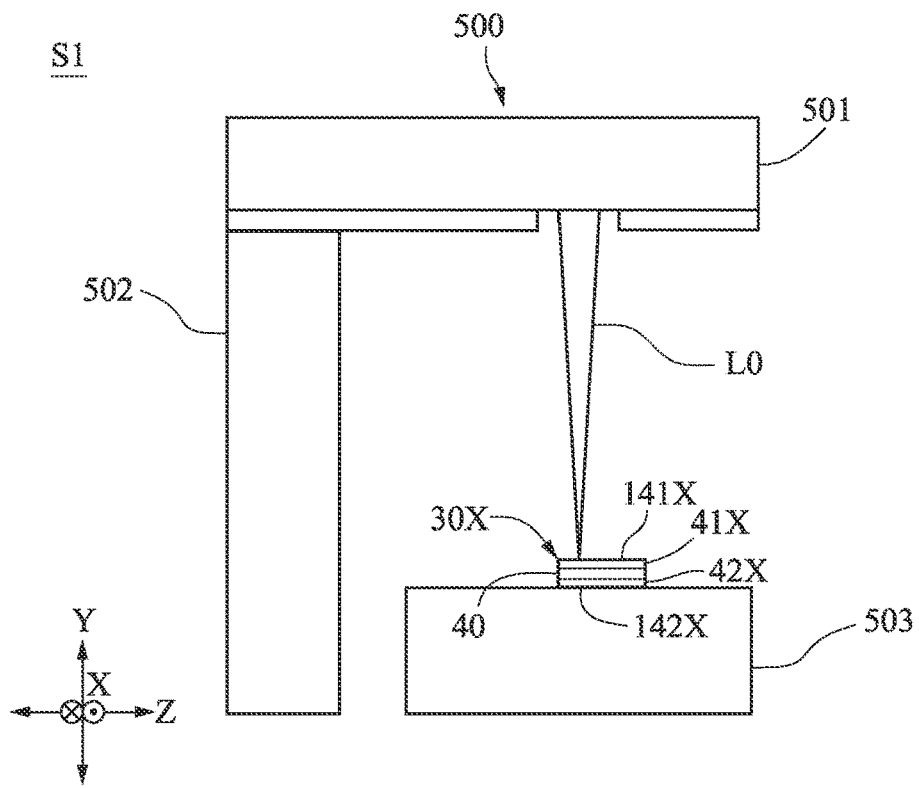
FIG. 6A is a schematic diagram of a laser machining apparatus of the first embodiment.
Figure 6B:
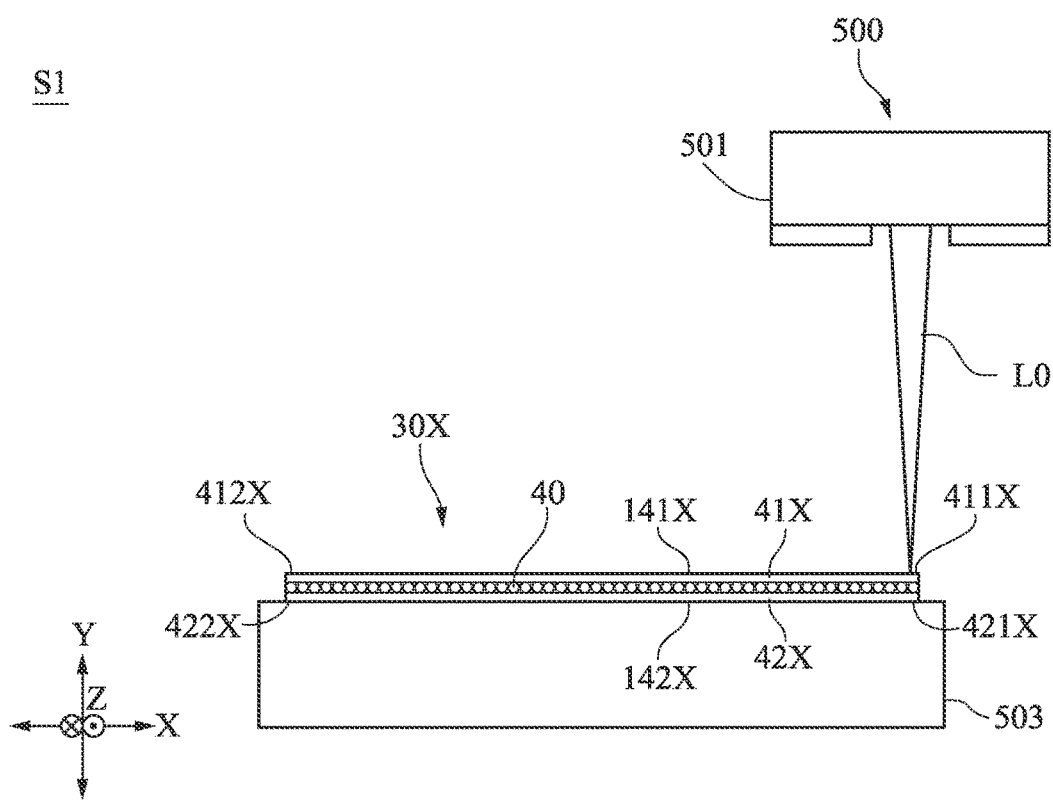
FIG. 6B is a schematic diagram of the laser machining apparatus of the first embodiment.

FIGS. 6A and 6B are schematic diagrams of a laser machining apparatus 500. Specifically, FIG. 6A is a schematic side view of the laser machining apparatus 500, and FIG. 6B is a schematic front view of the laser machining apparatus 500. In a first process S1 of the first embodiment, the lens array 30 illustrated in FIGS. 4A and 4B is formed by laser-machining a lens array 30X to be machined, by using the laser machining apparatus 500 illustrated in FIGS. 6A and 6B.

The laser machining apparatus 500 includes a laser 501, a stand 502 that supports the laser 501, and a support base 503 that supports the lens array 30X, which is an object to be machined. The support base 503 is a stage that can move the lens array 30X with respect to the laser 501 linearly in the X direction. The laser 501 used may be a YAG laser, a $CO_2$ laser, a green laser, a UV laser, or a fiber laser. The operation of the laser 501 for oscillating a laser beam L0 may be a continuous-wave oscillation operation or a pulse-wave oscillation operation.

Next, the first process S1 will be described in detail. First, the lens array 30X to be machined is prepared. The lens array 30X to be machined includes the plurality of lenses 40 arrayed in the X direction, and two side plates 41X and 42X to be machined that hold the plurality of lenses 40 therebetween in the Y direction. That is, concave portions are not yet formed in the side plates 41X and 42X of the lens array 30X. The lens array 30X is then set on the support base 503 such that the side plate 41X faces the laser 501.

The laser beam L0 is intermittently emitted by the laser 501, and the lens array 30X is moved in the X direction by the support base 503. By the laser beam L0 emitted by the laser 501, the plurality of concave portions 51 is formed in an outside surface 141X of the side plate 41X, from one end portion 411X of the side plate 41X to the other end portion 412X in the X direction. After the plurality of concave portions 51 is formed, the lens array 30X is turned upside down and set on the support base 503.

The laser beam L0 is intermittently emitted by the laser 501, and the lens array 30X is moved in the X direction by the support base 503. By the laser beam L0 emitted by the laser 501, the plurality of concave portions 52 is formed in an outside surface 142X of the side plate 42X, from one end portion 421X of the side plate 42X to the other end portion 422X in the X direction. In this manner, the lens array 30 illustrated in FIGS. 4A and 4B is formed.

Note that although the description has been made for the case where the preformed lens array 30X is prepared, the lens array to be machined is not limited to this. For example, the lens array 30 may be formed by preparing the side plates 41X and 42X, then forming the plurality of concave portions 51 in the side plate 41X and forming the plurality of concave portions 52 in the side plate 42X, then causing the side plates 41X and 42X to hold the plurality of lenses 40 therebetween, and then fixing the plurality of lenses 40 to the side plates 41X and 42X via adhesive.

In addition, although the description has been made for the case where the concave portions 51 are formed in the outside surface 141X, sequentially from the end portion 411X toward the end portion 412X, the present disclosure is not limited to this. For example, the concave portions 51 may be formed in the outside surface 141X, sequentially from the end portion 412X toward the end portion 411X. Similarly, although the description has been made for the case where the concave portions 52 are formed in the outside surface 142X, sequentially from the end portion 421X toward the end portion 422X, the present disclosure is not limited to this. For example, the concave portions 52 may be formed in the outside surface 142X, sequentially from the end portion 422X toward the end portion 421X. In addition, although the concave portions 51 are preferably formed in the outside surface 141X from one of the pair of end portions 411X and 412X toward the other in terms with productivity, the concave portions 51 may be formed in another order. Similarly, although the concave portions 52 are preferably formed in the outside surface 142X from one of the pair of end portions 421X and 422X toward the other in terms with productivity, the concave portions 52 may be formed in another order.

In addition, for forming one concave portion 51 in the side plate 41X, the laser beam L0 may be emitted several times, or may be emitted once. Similarly, for forming one concave portion 52 in the side plate 42X, the laser beam L0 may be emitted to an identical position several times, or may be emitted once. The number of emissions of the laser beam L0 may be determined, depending on the size of the concave portions to be formed, and on the output power of the laser beam L0. The contours and the inside of each concave portion may be formed by slightly shifting an irradiation position of the laser beam L0 in accordance with the size of each concave portion to be formed. In another case, each concave portion may be formed by irradiating an identical position with the laser beam L0. In addition, although the plurality of concave portions 51 is preferably arrayed in a single line in the X direction in terms with machining time and machining cost, the plurality of concave portions 51 may be arrayed in two or more lines. Similarly, although the plurality of concave portions 52 is preferably arrayed in a single line in the X direction in terms with machining time and machining cost, the plurality of concave portions 52 may be arrayed in two or more lines.

Second Process

In a second process, the frame 11 is formed. That is, in the second process, the lens array unit 80, which is illustrated in FIGS. 3A and 3B and in which the lens array 30 and the frame 11 are joined with each other as one body, is formed through insert molding. In the insert molding, molten thermoplastic resin or thermosetting resin is injected into the interior of a mold. Examples of the thermosetting resin include phenol resin, urea resin, melamine resin, and epoxy resin. Examples of the thermoplastic resin include PS, ABS, POM, PP, PMMA, PA, PPS, PC, and PC+ABS. Among the above-described resin materials, PC or PC+ABS is preferably used. The resin materials may contain fiber filler. Examples of the fiber filler include carbon fiber, glass fiber, metal fiber, and organic fiber. The following description will be made for a case where the resin material is a thermoplastic resin.

Figure 7A:
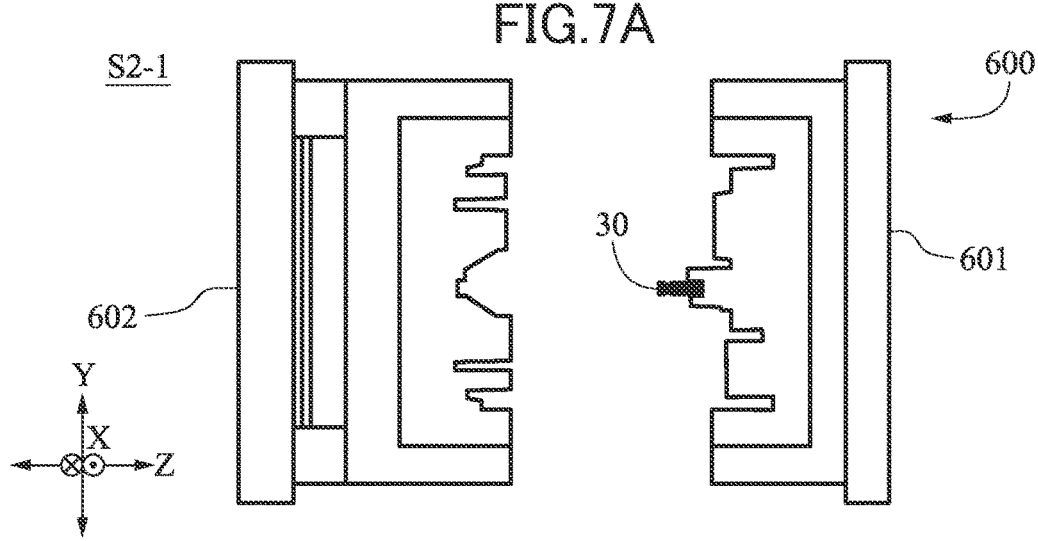
FIG. 7A is a schematic diagram for illustrating a manufacturing method of the first embodiment.
Figure 7B:
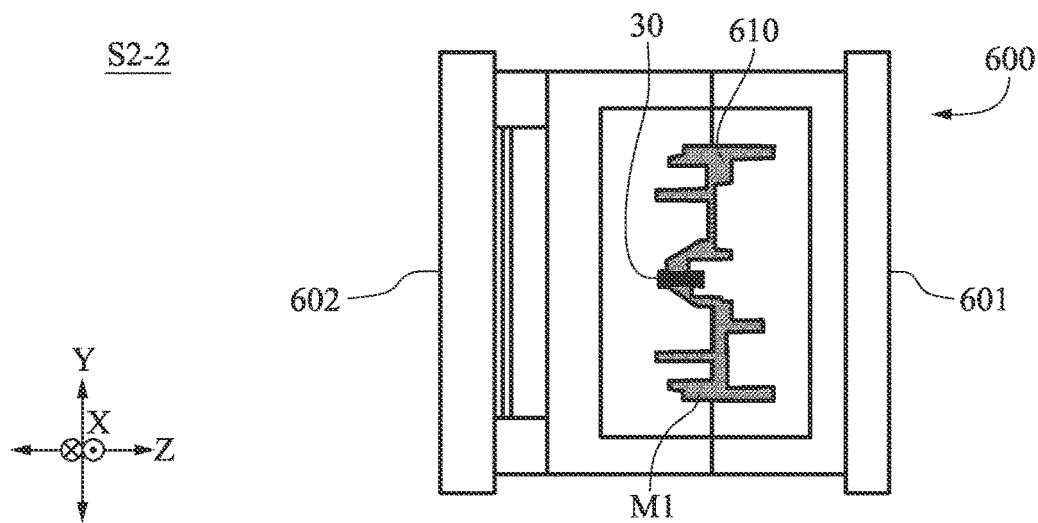
FIG. 7B is a schematic diagram for illustrating the manufacturing method of the first embodiment.
Figure 7C:
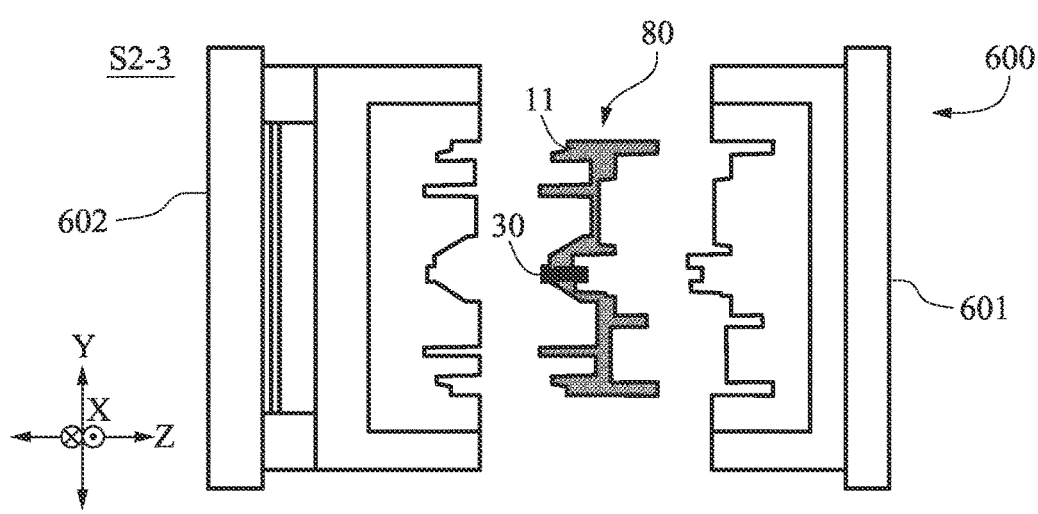
FIG. 7C is a schematic diagram for illustrating the manufacturing method of the first embodiment.

FIGS. 7A to 7C are schematic diagrams for illustrating the second process in which the insert molding is performed. FIGS. 7A to 7C illustrate processes S2-1 to S2-3 of the second process. A mold 600 illustrated in FIGS. 7A to 7C is installed on an injection molding machine (not illustrated). The mold 600 is a mold, and includes a stationary mold 601 that is one example of a first mold, and a movable mold 602 that is one example of a second mold.

In the process S2-1 illustrated in FIG. 7A, the mold 600 is opened, and the lens array 30 is supported by one of the stationary mold 601 and the movable mold 602. For example, the lens array 30 is supported by the stationary mold 601.

In the process S2-2 illustrated in FIG. 7B, the mold 600 is closed, and thereby the lens array 30 is set in the mold 600.

In the interior of the mold 600, a cavity 610 is defined. The lens array 30 is supported by the mold 600 such that the resin does not flow onto the light-incident surface and the light-emitting surface of the lens array 30. In addition, one area of the outside surface 141 of the lens array 30 that includes the plurality of concave portions 51, and one area of the outside surface 142 of the lens array 30 that includes the plurality of concave portions 52 are exposed to the cavity 610. Note that if the lens array 30 can be positioned and supported so as not to move in the cavity 610, the whole of the outside surface 141 and/or the whole of the outside surface 142 may be exposed to the cavity 610.

A molten resin M1 that is a molten thermoplastic resin is injected into the interior of the mold 600, that is, into the cavity 610 by the injection molding machine (not illustrated), so that the cavity 610 is filled with the molten resin M1. The molten resin M1 that has filled the cavity 610 contacts the one area of the outside surface 141 of the lens array 30 and the one area of the outside surface 142, and enters the plurality of concave portions 51 and 52. The molten resin M1 that has filled the cavity 610 is cooled and solidified in the mold 600, so that the frame 11 that is a cured object of the molten resin M1 is formed. The supporting portion 111 of the frame 11 formed in this manner is in contact with the one area of the outside surface 141. The supporting portion 112 of the frame 11 is in contact with the one area of the outside surface 142.

In the process S2-3 illustrated in FIG. 7C, the mold 600 is opened, and the lens array unit 80 in which the frame 11 and the lens array 30 are joined with each other as one body is taken out of the mold 600. Then, the wiring board 35 on which the image sensor 37 illustrated in FIG. 2 is mounted is fixed to the frame 11, so the image sensor unit 10 is formed.

In the first embodiment, since the joint strength between the lens array 30 and the frame 11 is increased by the plurality of concave portions 51 and 52, the need for the adhesive used for joining the lens array and the frame can be eliminated, and thus the manufacturing cost can be reduced by the cost of the adhesive.

Note that if the joint strength between the lens array 30 and the frame 11 can be ensured by a plurality of concave portions formed in one of the two side plates 41 and 42, a plurality of concave portions may not be formed in the other side plate.

Second Embodiment

Figure 8:
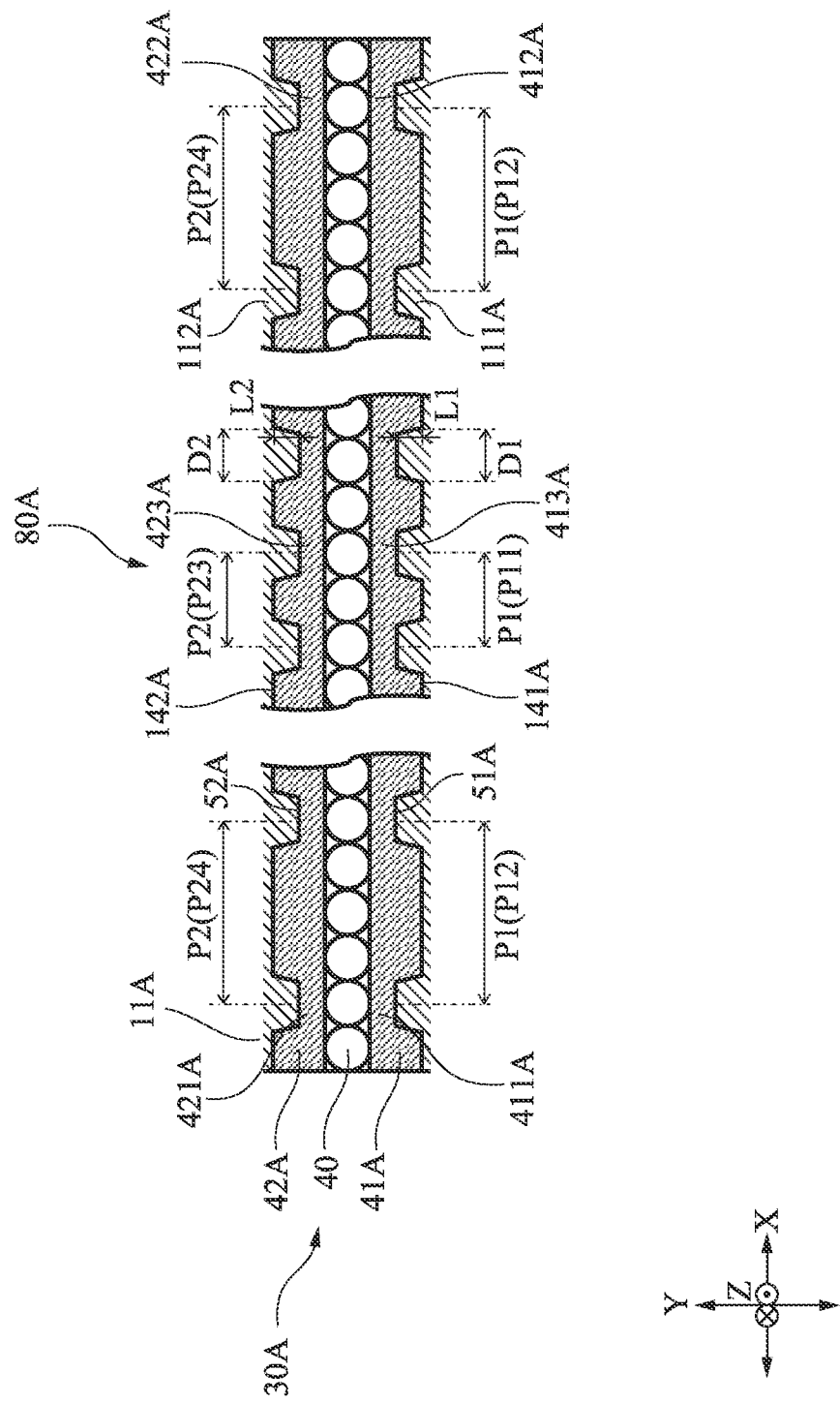
FIG. 8 is a sectional view of a lens array unit of a second embodiment.

Next, a lens array unit of a second embodiment will be described. FIG. 8 is a sectional view of a lens array unit 80A of the second embodiment. In the second embodiment, features different from those of the first embodiment will be described, and the description for the same features as those of the first embodiment will be omitted. In the second embodiment, components other than the lens array unit 80A are the same as those of the first embodiment. In addition, the method of manufacturing the lens array unit 80A in the second embodiment, that is, the method of manufacturing the image sensor unit is also the same as that in the first embodiment.

The lens array unit 80A includes a frame 11A and a lens array 30A. The material of the frame 11A is the same as the material of the frame 11 of the first embodiment. The lens array 30A includes a plurality of lenses 40 arrayed in the X direction, which is an array direction. The lens array 30A includes two side plates 41A and 42A that hold the plurality of lenses 40 therebetween in the Y direction. The plurality of lenses 40 and the pair of side plates 41A and 42A are fixed to each other via adhesive, and formed as one body. The side plate 41A is a first side plate, and the side plate 42A is a second side plate. The frame 11A includes a pair of supporting portions 111A and 112A that hold the lens array 30 therebetween and support the lens array 30A. The supporting portion 111A is a first supporting portion, and the supporting portion 112A is a second supporting portion. The supporting portion 111A is in contact with an outside surface 141A of the side plate 41A, and the supporting portion 112A is in contact with an outside surface 142A of the side plate 42A. The outside surface 141A is a first outside surface, and the outside surface 142A is a second outside surface.

The side plate 41A includes a plurality of concave portions 51A formed in the outside surface 141A and spaced from each other in the X direction. Similarly, the side plate 42A includes a plurality of concave portions 52A formed in the outside surface 142A and spaced from each other in the X direction. Each of the plurality of concave portions 51A is a first concave portion. Each of the plurality of concave portions 52A is a second concave portion. In the second embodiment, the plurality of concave portions 51A is arranged in an area of the outside surface 141A (the area is in contact with the supporting portion 111A) in a single line in the X direction. Similarly, the plurality of concave portions 52A is arranged in an area of the outside surface 142A (the area is in contact with the supporting portion 112A) in a single line in the X direction.

In a side view of the lens array 30A, that is, when the lens array 30A is viewed in the Y direction, each concave portion 51A is formed like a dot or circle, and each concave portion 52A is formed like a dot or circle. Note that the shape of the concave portions 51A and 52A viewed in the Y direction is not limited to a circle. For example, the shape of the concave portions 51A and 52A viewed in the Y direction may be any shape, such as an elliptical shape or a long-hole shape. Suitably, the shape of the concave portions 51A and 52A is a dot shape for ensuring sufficient joint strength. The concave portions 51A and 52A may be formed through cutting, drilling, grinding, or laser machining, but preferably, through laser machining for shortening the machining time. In addition, each concave portion 51A is preferably a bottomed hole for ensuring sufficient optical performance of each of the lenses 40. Similarly, each concave portion 52A is preferably a bottomed hole.

In addition, some of the plurality of concave portions 51A are preferably formed in a center portion 413A of the side plate 41A in the X direction. Similarly, some of the plurality of concave portions 52A are preferably formed in a center portion 423A of the side plate 42A in the X direction.

In addition, the plurality of concave portions 51A is more preferably formed from one end portion 411A to the other end portion 412A of the side plate 41A in the X direction. Similarly, the plurality of concave portions 52A is more preferably formed from one end portion 421A to the other end portion 422A of the side plate 42A in the X direction.

A diameter D1 of each of the plurality of concave portions 51A is preferably equal to or larger than 100 μm and equal to or smaller than 1000 μm, and more preferably, is equal to or larger than 300 μm and equal to or smaller than 800 μm. Similarly, a diameter D2 of each of the plurality of concave portions 52A is preferably equal to or larger than 100 μm and equal to or smaller than 1000 μm, and more preferably, is equal to or larger than 300 μm and equal to or smaller than 800 μm.

A depth L1 of each of the plurality of concave portions 51A in the Y direction is preferably equal to or larger than 50 μm and equal to or smaller than 400 μm, and more preferably, is equal to or larger than 100 μm and equal to or smaller than 300 μm. Similarly, a depth L2 of each of the plurality of concave portions 52A in the Y direction is preferably equal to or larger than 50 μm and equal to or smaller than 400 μm, and more preferably, is equal to or larger than 100 μm and equal to or smaller than 300 μm.

A pitch P1 of a pair of adjacent ones of the plurality of concave portions 51A is preferably equal to or larger than 300 μm and equal to or smaller than 3000 μm, and more preferably, is equal to or larger than 500 μm and equal to or smaller than 2000 μm. Similarly, a pitch P2 of a pair of adjacent ones of the plurality of concave portions 52A is preferably equal to or larger than 300 μm and equal to or smaller than 3000 μm, and more preferably, is equal to or larger than 500 μm and equal to or smaller than 2000 μm.

The plurality of concave portions 51A has the identical depth L1 in the Y direction. In addition, a pitch P11 of a pair of concave portions 51A positioned in the center portion 413A of the side plate 41A in the X direction is smaller than a pitch P12 of a pair of concave portions 51A positioned in each of the end portions 411A and 412A of the side plate 41A in the X direction. The pitch P11 is a first pitch, and the pitch P12 is a second pitch. The center portion 413A is a portion on which the stress easily concentrates. However, the joint strength between the center portion 413A of the side plate 41A and the supporting portion 111A can be increased with this structure.

The plurality of concave portions 52A has the identical depth L2 in the Y direction. In addition, a pitch P23 of a pair of concave portions 52A positioned in the center portion 423A of the side plate 42A in the X direction is smaller than a pitch P24 of a pair of concave portions 52A positioned in each of the end portions 421A and 422A of the side plate 42A in the X direction. The pitch P23 is a third pitch, and the pitch P24 is a fourth pitch. The center portion 423A is a portion on which the stress easily concentrates. However, the joint strength between the center portion 423A of the side plate 42A and the supporting portion 112A can be increased with this structure.

In the second embodiment, the pitch P1 of a pair of adjacent ones of the plurality of concave portions 51A is decreased, step by step, by a value equal to or larger than 1 μm and equal to or smaller than 5 μm, as the array of the concave portions 51A extends from the end portions 411A and 412A of the side plate 41A toward the center portion 413A in the X direction. With this structure, the joint strength between the side plate 41A and the supporting portion 111A can be further increased.

Similarly, the pitch P2 of a pair of adjacent ones of the plurality of concave portions 52A is decreased, step by step, by a value equal to or larger than 1 μm and equal to or smaller than 5 μm, as the array of the concave portions 52A extends from the end portions 421A and 422A of the side plate 42A toward the center portion 423A in the X direction. With this structure, the joint strength between the side plate 42A and the supporting portion 112A can be further increased.

As described above, also in the second embodiment, since the need for the adhesive can be eliminated as in the first embodiment, the manufacturing cost can be reduced by the cost of the adhesive.

In addition, although the plurality of concave portions 51A is preferably arrayed in a single line in the X direction in terms with machining time and machining cost, the plurality of concave portions 51A may be arrayed in two or more lines. Similarly, although the plurality of concave portions 52A is preferably arrayed in a single line in the X direction in terms with machining time and machining cost, the plurality of concave portions 52A may be arrayed in two or more lines.

Note that if the joint strength between the lens array 30A and the frame 11A can be ensured by a plurality of concave portions formed in one of the two side plates 41A and 42A, a plurality of concave portions may not be formed in the other side plate. In addition, one of the two side plates 41A and 42A may be the same as the side plate 41 or 42 described in the first embodiment.

In addition, although the description has been made for the case where the pitches P1 and P2 are gradually decreased as the array of the concave portions extends from the end portions toward the center portion, the present disclosure is not limited to this. For example, the pitches P1 and P2 may be decreased in stages.

Third Embodiment

Figure 9:
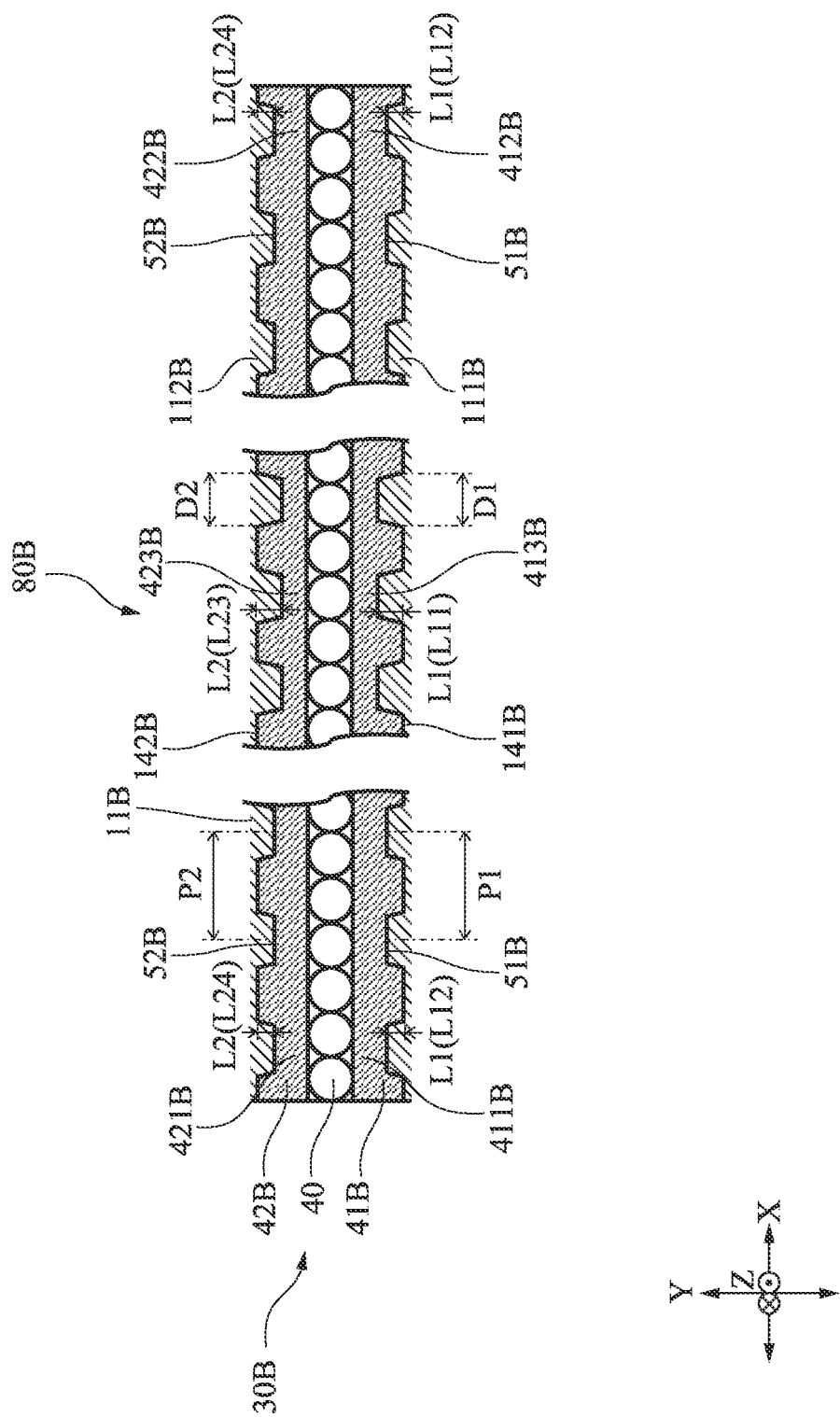
FIG. 9 is a sectional view of a lens array unit of a third embodiment.

Next, a lens array unit of a third embodiment will be described. FIG. 9 is a sectional view of a lens array unit 80B of the third embodiment. In the third embodiment, features different from those of the first embodiment will be described, and the description for the same features as those of the first embodiment will be omitted. In the third embodiment, components other than the lens array unit 80B are the same as those of the first embodiment. In addition, the method of manufacturing the lens array unit 80B in the third embodiment, that is, the method of manufacturing the image sensor unit is also the same as that in the first embodiment.

The lens array unit 80B includes a frame 11B and a lens array 30B. The material of the frame 11B is the same as the material of the frame 11 of the first embodiment. The lens array 30B includes a plurality of lenses 40 arrayed in the X direction, which is an array direction. The lens array 30B includes two side plates 41B and 42B that hold the plurality of lenses 40 therebetween in the Y direction. The plurality of lenses 40 and the pair of the side plates 41B and 42B are fixed to each other via adhesive, and formed as one body. The side plate 41B is a first side plate, and the side plate 42B is a second side plate. The frame 11B includes a pair of supporting portions 111B and 112B that hold the lens array 30B therebetween and support the lens array 30B. The supporting portion 111B is a first supporting portion, and the supporting portion 112B is a second supporting portion. The supporting portion 111B is in contact with an outside surface 141B of the side plate 41B, and the supporting portion 112B is in contact with an outside surface 142B of the side plate 42B. The outside surface 141B is a first outside surface, and the outside surface 142B is a second outside surface.

The side plate 41B includes a plurality of concave portions 51B formed in the outside surface 141B and spaced from each other in the X direction. Similarly, the side plate 42B includes a plurality of concave portions 52B formed in the outside surface 142B and spaced from each other in the X direction. Each of the plurality of concave portions 51B is a first concave portion. Each of the plurality of concave portions 52B is a second concave portion. In the third embodiment, the plurality of concave portions 51B is arranged in an area of the outside surface 141B (the area is in contact with the supporting portion 111B) in a single line in the X direction. Similarly, the plurality of concave portions 52B is arranged in an area of the outside surface 142B (the area is in contact with the supporting portion 112B) in a single line in the X direction.

In a side view of the lens array 30B, that is, when the lens array 30B is viewed in the Y direction, each concave portion 51B is formed like a dot or circle, and each concave portion 52B is formed like a dot or circle. Note that the shape of the concave portions 51B and 52B viewed in the Y direction is not limited to a circle. For example, the shape of the concave portions 51B and 52B viewed in the Y direction may be any shape, such as an elliptical shape or a long-hole shape. Suitably, the shape of the concave portions 51B and 52B is a dot shape for ensuring sufficient joint strength. The concave portions 51B and 52B may be formed through cutting, drilling, grinding, or laser machining, but preferably, through laser machining for shortening the machining time. In addition, each concave portion 51B is preferably a bottomed hole for ensuring sufficient optical performance of each of the lenses 40. Similarly, each concave portion 52B is preferably a bottomed hole.

In addition, some of the plurality of concave portions 51B are preferably formed in a center portion 413B of the side plate 41B in the X direction. Similarly, some of the plurality of concave portions 52B are preferably formed in a center portion 423B of the side plate 42B in the X direction.

In addition, the plurality of concave portions 51B is preferably formed from one end portion 411B to the other end portion 412B of the side plate 41B in the X direction. Similarly, the plurality of concave portions 52B is preferably formed from one end portion 421B to the other end portion 422B of the side plate 42B in the X direction.

A diameter D1 of each of the plurality of concave portions 51B is preferably equal to or larger than 100 μm and equal to or smaller than 1000 μm, and more preferably, is equal to or larger than 300 μm and equal to or smaller than 800 μm. Similarly, a diameter D2 of each of the plurality of concave portions 52B is preferably equal to or larger than 100 μm and equal to or smaller than 1000 μm, and more preferably, is equal to or larger than 300 μm and equal to or smaller than 800 μm.

A depth L1 of each of the plurality of concave portions 51B in the Y direction is preferably equal to or larger than 50 μm and equal to or smaller than 400 μm, and more preferably, is equal to or larger than 100 μm and equal to or smaller than 300 μm. Similarly, a depth L2 of each of the plurality of concave portions 52B in the Y direction is preferably equal to or larger than 50 μm and equal to or smaller than 400 μm, and more preferably, is equal to or larger than 100 μm and equal to or smaller than 300 μm. If the depth is equal to or larger than 50 μm, the joint strength between the lens array 30B and the frame 11B can be increased; if the depth is equal to or smaller than 400 μm, it possible to fill the resin within the concave portions and form the frame within the concave portions without exerting adverse influence upon the lenses 40.

The plurality of concave portions 51B is arrayed in the X direction at the constant pitch P1. The plurality of concave portions 52B is arrayed in the X direction at the constant pitch P2. The pitch P1 of a pair of adjacent ones of the plurality of concave portions 51B is preferably equal to or larger than 300 μm and equal to or smaller than 3000 μm, and more preferably, is equal to or larger than 500 μm and equal to or smaller than 2000 μm. Similarly, the pitch P2 of a pair of adjacent ones of the plurality of concave portions 52B is preferably equal to or larger than 300 μm and equal to or smaller than 3000 μm, and more preferably, is equal to or larger than 500 μm and equal to or smaller than 2000 μm.

In addition, a depth L11 (in the Y direction) of a concave portion 51B (of the plurality of concave portions 51B) positioned in a center portion 413B of the side plate 41B in the X direction is larger than a depth L12 (in the Y direction) of concave portions 51B positioned in the end portions 411B and 412B of the side plate 41B in the X direction. The depth L11 is a first depth, and the depth L12 is a second depth. The center portion 413B is a portion on which the stress easily concentrates. However, the joint strength between the center portion 413B of the side plate 41B and the supporting portion 111B can be increased with this structure.

In addition, a depth L23 (in the Y direction) of a concave portion 52B (of the plurality of concave portions 52B) positioned in a center portion 423B of the side plate 42B in the X direction is larger than a depth L24 (in the Y direction) of concave portions 52B positioned in the end portions 421B and 422B of the side plate 42B in the X direction. The depth L23 is a third depth, and the depth L24 is a fourth depth. The center portion 423B is a portion on which the stress easily concentrates. However, the joint strength between the center portion 423B of the side plate 42B and the supporting portion 112B can be increased with this structure.

In the third embodiment, the depth L1 of the plurality of concave portions 51B is increased, step by step, by a value equal to or larger than 1 μm and equal to or smaller than 5 μm, as the array of the concave portions 51B of the side plate 41B extends from the edge portions 411B and 412B toward the center portion 413B in the X direction. With this structure, the joint strength between the side plate 41B and the supporting portion 111B can be further increased.

In addition, the depth L2 of the plurality of concave portions 52B is increased, step by step, by a value equal to or larger than 1 μm and equal to or smaller than 5 μm, as the array of the concave portions 52B of the side plate 42B extends from the edge portions 421B and 422B toward the center portion 423B in the X direction. With this structure, the joint strength between the side plate 42B and the supporting portion 112B can be further increased.

As described above, also in the third embodiment, since the need for the adhesive can be eliminated as in the first embodiment, the manufacturing cost can be reduced by the cost of the adhesive.

In addition, although the plurality of concave portions 51B is preferably arrayed in a single line in the X direction in terms with machining time and machining cost, the plurality of concave portions 51B may be arrayed in two or more lines. Similarly, although the plurality of concave portions 52B is preferably arrayed in a single line in the X direction in terms with machining time and machining cost, the plurality of concave portions 52B may be arrayed in two or more lines.

Note that if the joint strength between the lens array 30B and the frame 11B can be ensured by a plurality of concave portions formed in one of the two side plates 41B and 42B, a plurality of concave portions may not be formed in the other side plate. In addition, one of the two side plates 41B and 42B may be the same as the side plate 41 or 42 described in the first embodiment, or the side plate 41A or 42A described in the second embodiment.

In addition, although the description has been made for the case where the depths L1 and L2 are gradually increased as the array of the concave portions extends from the end portions toward the center portion, the present disclosure is not limited to this. For example, the depths L1 and L2 may be increased in stages.

Fourth Embodiment

Figure 10:
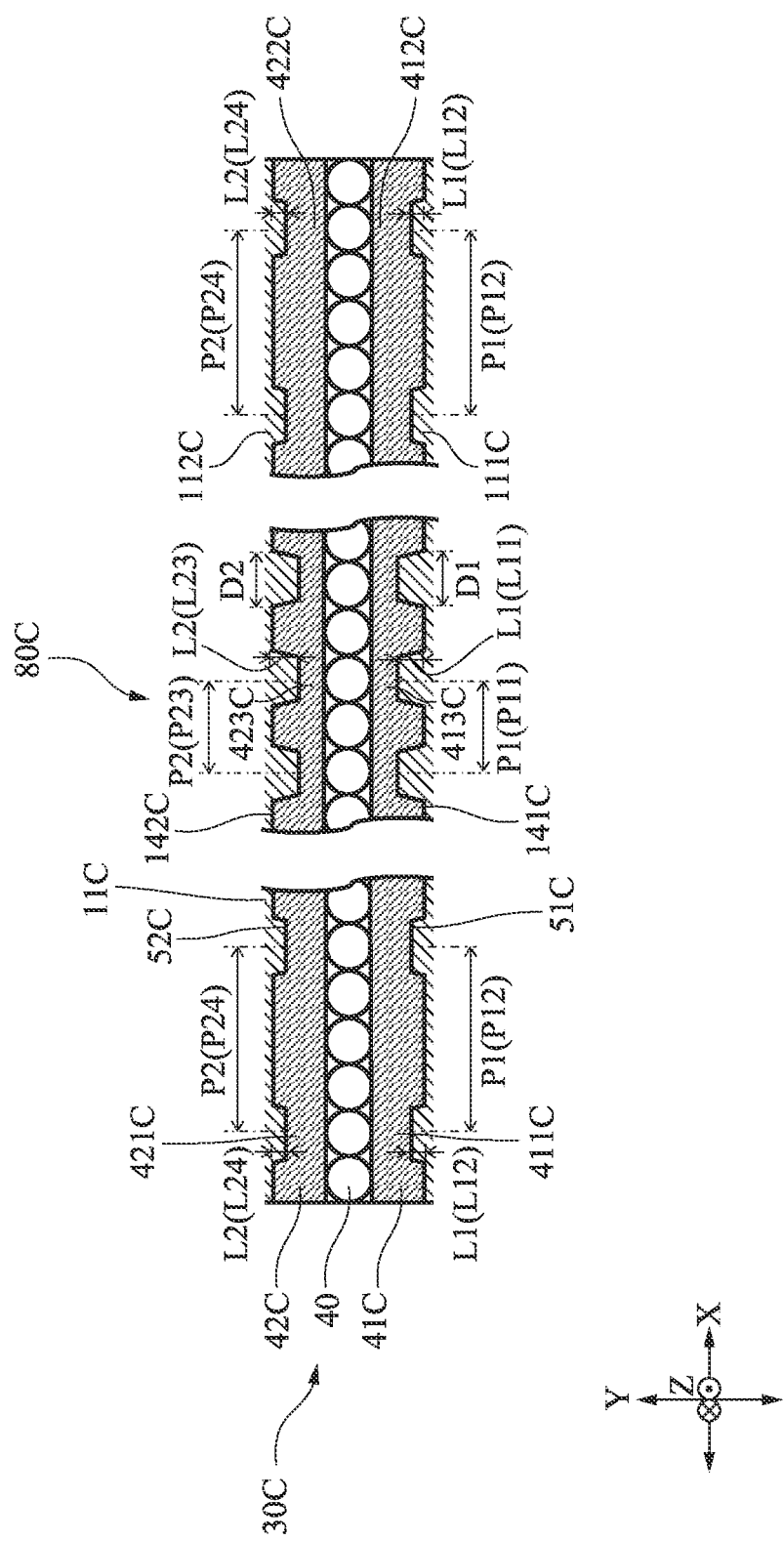
FIG. 10 is a sectional view of a lens array unit of a fourth embodiment.

Next, a lens array unit of a fourth embodiment will be described. FIG. 10 is a sectional view of a lens array unit 80C of the fourth embodiment. In the fourth embodiment, features different from those of the first embodiment will be described, and the description for the same features as those of the first embodiment will be omitted. In the fourth embodiment, components other than the lens array unit 80C are the same as those of the first embodiment. In addition, the method of manufacturing the lens array unit 80C in the fourth embodiment, that is, the method of manufacturing the image sensor unit is also the same as that in the first embodiment.

The lens array unit 80C includes a frame 11C and a lens array 30C. The material of the frame 11C is the same as the material of the frame 11 of the first embodiment. The lens array 30C includes a plurality of lenses 40 arrayed in the X direction, which is an array direction. The lens array 30C includes two side plates 41C and 42C that hold the plurality of lenses 40 therebetween in the Y direction. The plurality of lenses 40 and the pair of the side plates 41C and 42C are fixed to each other via adhesive, and formed as one body. The side plate 41C is a first side plate, and the side plate 42C is a second side plate. The frame 11C includes a pair of supporting portions 111C and 112C that hold the lens array 30C therebetween and support the lens array 30C. The supporting portion 111C is a first supporting portion, and the supporting portion 112C is a second supporting portion. The supporting portion 111C is in contact with an outside surface 141C of the side plate 41C, and the supporting portion 112C is in contact with an outside surface 142C of the side plate 42C. The outside surface 141C is a first outside surface, and the outside surface 142C is a second outside surface.

The side plate 41C includes a plurality of concave portions 51C formed in the outside surface 141C and spaced from each other in the X direction. Similarly, the side plate 42C includes a plurality of concave portions 52C formed in the outside surface 142C and spaced from each other in the X direction. Each of the plurality of concave portions 51C is a first concave portion. Each of the plurality of concave portions 52C is a second concave portion. In the fourth embodiment, the plurality of concave portions 51C is arranged in an area of the outside surface 141C (the area is in contact with the supporting portion 111C) in a single line in the X direction. Similarly, the plurality of concave portions 52C is arranged in an area of the outside surface 142C (the area is in contact with the supporting portion 112C) in a single line in the X direction.

In a side view of the lens array 30C, that is, when the lens array 30C is viewed in the Y direction, each concave portion 51C is formed like a dot or circle, and each concave portion 52C is formed like a dot or circle. Note that the shape of the concave portions 51C and 52C viewed in the Y direction is not limited to a circle. For example, the shape of the concave portions 51C and 52C viewed in the Y direction may be any shape, such as an elliptical shape or a long-hole shape. Suitably, the shape of the concave portions 51C and 52C is a dot shape for ensuring sufficient joint strength. The concave portions 51C and 52C may be formed through cutting, drilling, grinding, or laser machining, but preferably, through laser machining for shortening the machining time. In addition, each concave portion 51C is preferably a bottomed hole for ensuring sufficient optical performance of each of the lenses 40. Similarly, each concave portion 52C is preferably a bottomed hole.

In addition, some of the plurality of concave portions 51C are preferably formed in a center portion 413C of the side plate 41C in the X direction. Similarly, some of the plurality of concave portions 52C are preferably formed in a center portion 423C of the side plate 42C in the X direction.

In addition, the plurality of concave portions 51C is more preferably formed from one end portion 411C to the other end portion 412C of the side plate 41C in the X direction. Similarly, the plurality of concave portions 52C is more preferably formed from one end portion 421C to the other end portion 422C of the side plate 42C in the X direction.

A diameter D1 of each of the plurality of concave portions 51C is preferably equal to or larger than 100 μm and equal to or smaller than 1000 μm, and more preferably, is equal to or larger than 300 μm and equal to or smaller than 800 μm. Similarly, a diameter D2 of each of the plurality of concave portions 52C is preferably equal to or larger than 100 μm and equal to or smaller than 1000 μm, and more preferably, is equal to or larger than 300 μm and equal to or smaller than 800 μm.

A depth L1 of each of the plurality of concave portions 51C in the Y direction is preferably equal to or larger than 50 μm and equal to or smaller than 400 μm, and more preferably, is equal to or larger than 100 μm and equal to or smaller than 300 μm. Similarly, a depth L2 of each of the plurality of concave portions 52C in the Y direction is preferably equal to or larger than 50 μm and equal to or smaller than 400 μm, and more preferably, is equal to or larger than 100 μm and equal to or smaller than 300 μm. If the depth is equal to or larger than 50 μm, the joint strength between the lens array 30C and the frame 11C can be increased; if the depth is equal to or smaller than 400 μm, it possible to fill the resin within the concave portions and form the frame within the concave portions without exerting adverse influence upon the lenses 40.

A pitch P1 of a pair of adjacent ones of the plurality of concave portions 51C is preferably equal to or larger than 300 μm and equal to or smaller than 3000 μm, and more preferably, is equal to or larger than 500 μm and equal to or smaller than 2000 μm. Similarly, a pitch P2 of a pair of adjacent ones of the plurality of concave portions 52C is preferably equal to or larger than 300 μm and equal to or smaller than 3000 μm, and more preferably, is equal to or larger than 500 μm and equal to or smaller than 2000 μm.

In addition, a pitch P11 of a pair of concave portions 51C positioned in the center portion 413C of the side plate 41C in the X direction is smaller than a pitch P12 of a pair of concave portions 51C positioned in each of the end portions 411C and 412C of the side plate 41C in the X direction. The pitch P11 is a first pitch, and the pitch P12 is a second pitch. The center portion 413C is a portion on which the stress easily concentrates. However, the joint strength between the center portion 413C of the side plate 41C and the supporting portion 111C can be increased with this structure.

Similarly, a pitch P23 of a pair of concave portions 52C positioned in the center portion 423C of the side plate 42C in the X direction is smaller than a pitch P24 of a pair of concave portions 52C positioned in each of the end portions 421C and 422C of the side plate 42C in the X direction. The pitch P23 is a third pitch, and the pitch P24 is a fourth pitch. The center portion 423C is a portion on which the stress easily concentrates. However, the joint strength between the center portion 423C of the side plate 42C and the supporting portion 112C can be increased with this structure.

In the fourth embodiment, the pitch P1 of a pair of adjacent ones of the plurality of concave portions 51C is decreased, step by step, by a value equal to or larger than 1 μm and equal to or smaller than 5 μm, as the array of the concave portions 51C extends from the end portions 411C and 412C of the side plate 41C toward the center portion 413C in the X direction. With this structure, the joint strength between the side plate 41C and the supporting portion 111C can be further increased.

Similarly, the pitch P2 of a pair of adjacent ones of the plurality of concave portions 52C is decreased, step by step, by a value equal to or larger than 1 μm and equal to or smaller than 5 μm, as the array of the concave portions 52C extends from the end portions 421C and 422C of the side plate 42C toward the center portion 423C in the X direction. With this structure, the joint strength between the side plate 42C and the supporting portion 112C can be further increased.

In addition, a depth L11 (in the Y direction) of a concave portion 51C (of the plurality of concave portions 51C) positioned in the center portion 413C of the side plate 41C in the X direction is larger than a depth L12 (in the Y direction) of concave portions 51C positioned in the end portions 411C and 412C of the side plate 41C in the X direction. The depth L11 is a first depth, and the depth L12 is a second depth. The center portion 413C is a portion on which the stress easily concentrates. However, the joint strength between the center portion 413C of the side plate 41C and the supporting portion 111C can be increased with this structure.

Similarly, a depth L23 (in the Y direction) of a concave portion 52C (of the plurality of concave portions 52C) positioned in the center portion 423C of the side plate 42C in the X direction is larger than a depth L24 (in the Y direction) of concave portions 52C positioned in the end portions 421C and 422C of the side plate 42C in the X direction. The depth L23 is a third depth, and the depth L24 is a fourth depth. The center portion 423C is a portion on which the stress easily concentrates. However, the joint strength between the center portion 423C of the side plate 42C and the supporting portion 112C can be increased with this structure.

In the fourth embodiment, the depth L1 of the plurality of concave portions 51C is increased, step by step, by a value equal to or larger than 1 μm and equal to or smaller than 5 μm, as the array of the concave portions 51C of the side plate 41C extends from the edge portions 411C and 412C toward the center portion 413C in the X direction. With this structure, the joint strength between the side plate 41C and the supporting portion 111C can be further increased.

Similarly, the depth L2 of the plurality of concave portions 52C is increased, step by step, by a value equal to or larger than 1 μm and equal to or smaller than 5 μm, as the array of the concave portions 52C of the side plate 42C extends from the edge portions 421C and 422C toward the center portion 423C in the X direction. With this structure, the joint strength between the side plate 42C and the supporting portion 112C can be further increased.

As described above, also in the fourth embodiment, since the need for the adhesive can be eliminated as in the first embodiment, the manufacturing cost can be reduced by the cost of the adhesive.

In addition, although the plurality of concave portions 51C is preferably arrayed in a single line in the X direction in terms with machining time and machining cost, the plurality of concave portions 51C may be arrayed in two or more lines. Similarly, although the plurality of concave portions 52C is preferably arrayed in a single line in the X direction in terms with machining time and machining cost, the plurality of concave portions 52C may be arrayed in two or more lines.

Note that if the joint strength between the lens array 30C and the frame 11C can be ensured by a plurality of concave portions formed in one of the two side plates 41C and 42C, a plurality of concave portions may not be formed in the other side plate. In addition, one of the two side plates 41C and 42C may be the same as the side plate 41 or 42 described in the first embodiment, the side plate 41A or 42A described in the second embodiment, or the side plate 41B or 42B described in the third embodiment.

In addition, although the description has been made for the case where the pitches P1 and P2 are gradually decreased as the array of the concave portions extends from the end portions toward the center portion, the present disclosure is not limited to this. For example, the pitches P1 and P2 may be decreased in stages. In addition, although the description has been made for the case where the depths L1 and L2 are gradually increased as the array of the concave portions extends from the end portions toward the center portion, the present disclosure is not limited to this. For example, the depths L1 and L2 may be increased in stages.

EXAMPLES

Figure 11A:
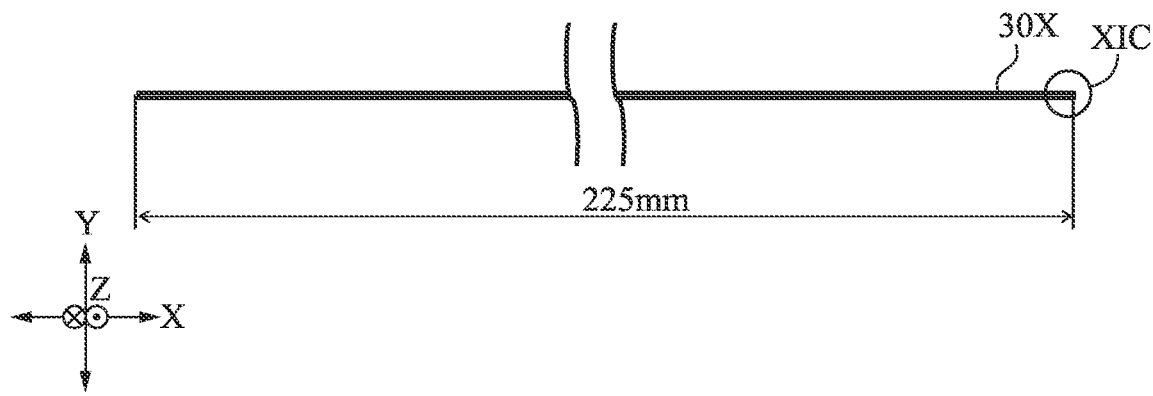
FIG. 11A is a diagram illustrating a lens array to be machined in examples.
Figure 11B:
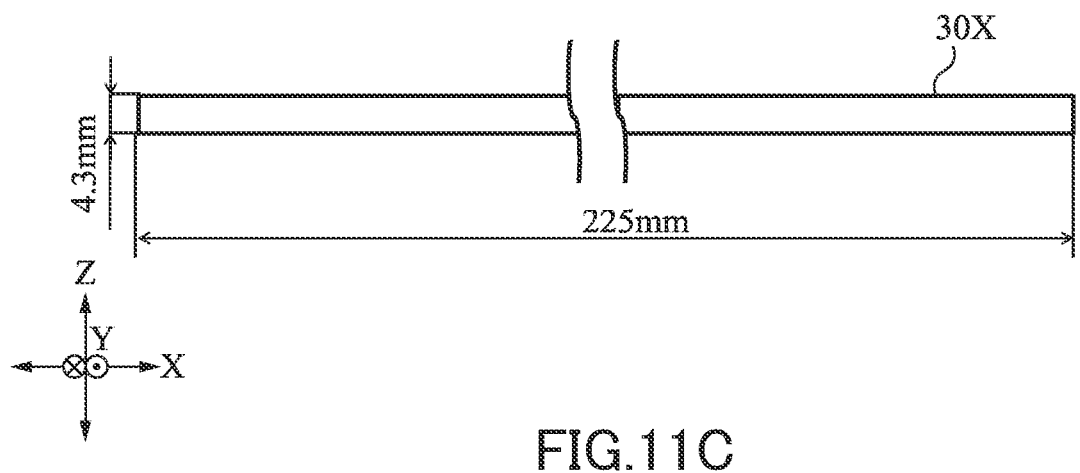
FIG. 11B is a diagram illustrating the lens array to be machined in the examples.
Figure 11C:
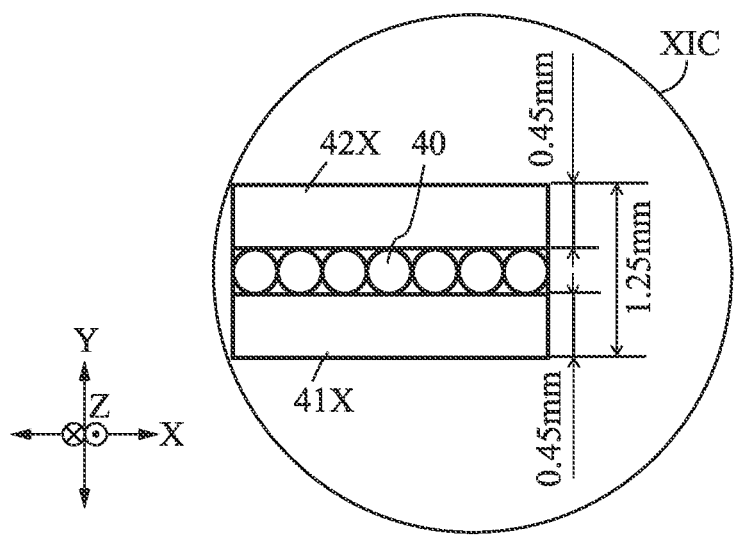
FIG. 11C is a diagram illustrating the lens array to be machined in the examples.

FIGS. 11A to 11C are diagrams illustrating a lens array 30X to be machined in examples. FIG. 11C is an enlarged view of an area XIC illustrated in FIG. 11A. The length of the lens array 30X in the X direction was 225 mm. The length of the lens array 30X in the Z direction was 4.3 mm. The thickness of the lens array 30X in the Y direction was 1.25 mm. The thickness of each of side plates 41X and 42X in the Y direction was 0.45 mm.

A plurality of concave portions was formed in an outside surface 141X of the side plate 41X and an outside surface 142X of the side plate 42X by irradiating the outside surfaces 141X and 142X with laser beams. The laser oscillator used was a Laser Marker MD-X1020 made by KEYENCE CORPORATION. The diameter and the depth of each concave portion were measured by using a Laser Microscope VK-X100 made by KEYENCE CORPORATION. The diameter and the depth were obtained by selecting five concave portions from among the plurality of concave portions and averaging diameters and depths of the selected concave portions.

Then, the lens array 30 in which the concave portions were formed was set in a mold for forming the frame 11, and the lens array unit 80 including the lens array 30 and the frame 11 was formed through insert molding.

The frame 11 was formed so that the frame 11 can be used for the printer 100 that forms an image on an A4-size sheet. The resin of the frame 11 was PC+GF40% made by TEIJIN LIMITED. The molding machine used was a molding machine made by Sumitomo Heavy Industries, Ltd. and having a mold clamping force of 100 t and a screw size of φ25. The temperature of the molten resin was 280° C., and the temperature of the mold was 80° C.

Figure 12:
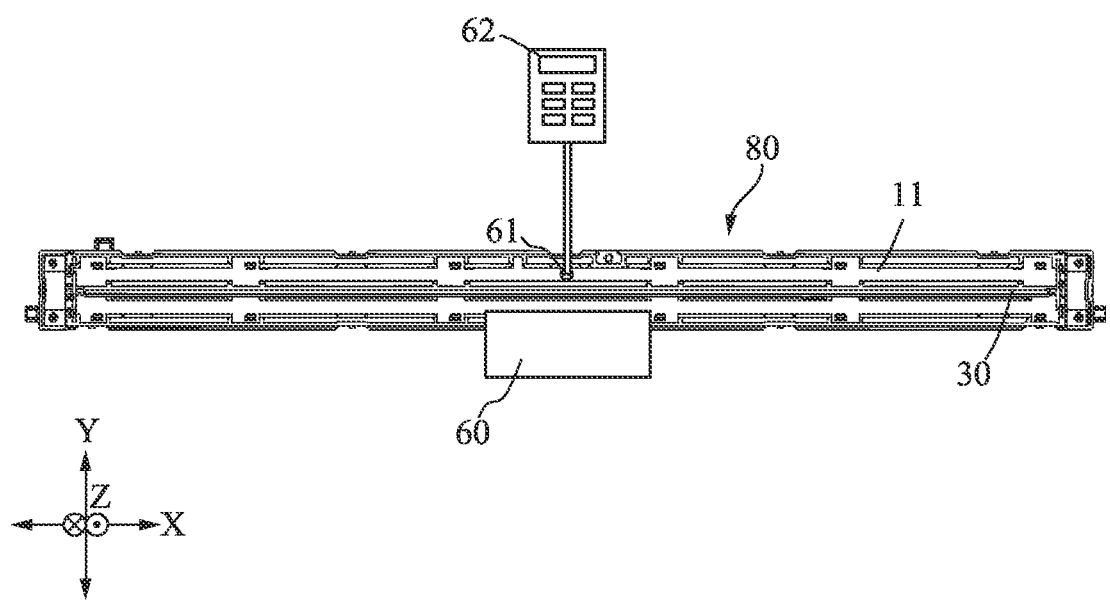
FIG. 12 is a diagram illustrating tensile test performed in the examples.

After the insert molding, tensile test was performed on the frame 11. FIG. 12 is a diagram illustrating the tensile test performed in the examples. First, a through-hole 61 was formed in the frame 11, at a center position of the frame 11 in the X direction. Then, a portion of the frame 11 symmetric to the through-hole 61 in a straight line passing through a center position of the lens array 30 in the Y direction was fixed to a vise 60. And then, a push-pull gauge 62 was attached to the through-hole 61. With this configuration, the tensile strength of the lens array unit 80 was measured by pulling the push-pull gauge 62 in the Y direction. Note that although not illustrated in FIG. 12, the lens array units 80A, 80B, and 80C were prepared in the same manner, and the tensile strength of the lens array units 80A, 80B, and 80C were measured by using the gauge illustrated in FIG. 12.

In addition, two types of optical performance, brightness of output light and resolution, were compared between lens array units of examples, lens array units of comparative examples, and a conventional lens array unit in which the lens array 30X was fixed to the frame via adhesive.

Next, measurement results in Examples 1 to 8 corresponding to the first embodiment, and measurement results in Comparative Examples 1 and 2 will be described. FIG. 13 illustrates irradiation conditions of the laser beam and measurement results. Note that if the optical performance is the same as that of the conventional lens array unit, the optical performance is indicated by a symbol "A"; if the optical performance is inferior to that of the conventional lens array unit, the optical performance is indicated by a symbol "B".

In Example 1, the diameter of each concave portion was 312 μm. In Comparative Example 1, the diameter was zero because the insert molding was performed without performing the laser machining on the lens array 30X. In Example 2, the diameter of each concave portion was 788 μm. In Example 3, the diameter of each concave portion was 201 μm.

As the result of the tensile test, the tensile strength was 8 kg or mote in Examples 1 and 2, 2 kg in Example 3, and 0 kg in Comparative Example 1. In Examples 1 to 3, the optical performance was equal to that of the conventional lens array unit, and was given an evaluation of "A". In Comparative Example 1, a gap was formed between the lens array 30X and the frame. Thus, the optical performance was not equal to that of the conventional lens array unit, and was given an evaluation of "B".

In Example 4, the depth of each concave portion was 106 μm. In Example 5, the depth of each concave portion was 399 μm. In Comparative Example 2, the depth of each concave portion was 458 μm. After the insert molding, the tensile test was performed. In all of Example 4, Example 5, and Comparative Example 2, the tensile strength was 8 kg or more. In Examples 4 and 5, the optical performance was equal to that of the conventional lens array unit, and was given an evaluation of "A". In Comparative Example 2, since the concave portions reached the lenses 40, the optical performance was not equal to that of the conventional lens array unit, and was given an evaluation of "B".

In Example 6, the pitch of two adjacent concave portions was 500 μm. In Example 7, the pitch of two adjacent concave portions was 2000 μm. In Example 8, the pitch of two adjacent concave portions was 2500 μm. As the result of the tensile test, the tensile strength was 8 kg or mote in Examples 6 and 7, and 3 kg in Example 8. In Examples 6 to 8, the optical performance was equal to that of the conventional lens array unit, and was given an evaluation of "A".

As described above, in Examples 1, 2, 4, 5, 6, and 7, the lenses 40 can produce high optical performance, and the lens array unit 80 can achieve a tensile strength of 8 kg or more. If the lens array unit 80 has a tensile strength of 3 kg or more, the lens array unit 80 can withstand the shock applied to the frame 11. If the lens array unit 80 has a tensile strength of 8 kg or more, the lens array unit 80 can sufficiently withstand even when stronger shock is applied to the frame 11.

Next, measurement results in Example 9 corresponding to the second embodiment, and measurement results in Example 10 corresponding to the first embodiment will be described. FIG. 14 illustrates irradiation conditions of the laser beam and measurement results. In Example 9, the pitch of two adjacent concave portions in both end portions of the lens array was set to 1500 μm. In addition, in Example 9, the pitch was changed, step by step, by −5 μm as the array of concave portions extends toward the center portion of the lens array. That is, the pitch was gradually decreased by 5 μm as the array of concave portions extends toward the center portion of the lens array in the X direction. In Example 10, the pitch of two adjacent concave portions was set to a constant value of 1500 μm in a portion from one end portion to the other end portion of the lens array. The machining and the tensile test were performed after the insert molding. In Example 9, the machining time was 13 seconds, and the tensile strength was 10 kg. In Example 10, the machining time was 11 seconds, and the tensile strength was 6 kg. Thus, the tensile strength of Example 9 was improved compared to the tensile strength of Example 10. In Examples 9 and 10, the optical performance was equal to that of the conventional lens array unit, and was given an evaluation of "A".

In Example 9, the machining time for the concave portions can be shortened, and the lens array unit 80A can achieve a tensile strength of 8 kg or more.

Next, measurement results in Example 11 corresponding to the third embodiment, and measurement results in Example 12 corresponding to the first embodiment will be described. FIG. 15 illustrates irradiation conditions of the laser beam and measurement results. In Example 11, the depth of concave portions in both end portions of the lens array was set to 100 μm. In addition, in Example 11, the depth was changed, step by step, by −2.5 μm as the array of concave portions extends toward the center portion of the lens array. That is, the depth was gradually decreased by 2.5 μm as the array of concave portions extends toward the center portion of the lens array in the X direction. In Example 12, the depth of the concave portions was set to a constant value of 100 μm in a portion from one end portion to the other end portion of the image sensor. The machining and the tensile test were performed after the insert molding. In Example 11, the machining time was 13 seconds, and the tensile strength was 10 kg. In Example 12, the machining time was 4 seconds, and the tensile strength was 3 kg. Thus, the tensile strength of Example 11 was improved compared to the tensile strength of Example 12. In Examples 11 and 12, the optical performance was equal to that of the conventional lens array unit, and was given an evaluation of "A".

In Example 11, the machining time for the concave portions can be shortened, and the lens array unit 80B can achieve a tensile strength of 8 kg or more.

Next, measurement results in Example 13 corresponding to the fourth embodiment, and measurement results in Example 14 corresponding to the first embodiment will be described. FIG. 16 illustrates irradiation conditions of the laser beam and measurement results. In Example 13, the depth of concave portions in both end portions of the lens array was set to 100 μm. In addition, in Example 13, the depth was changed, step by step, by −2.5 μm as the array of concave portions extends toward the center portion of the lens array. That is, the depth was gradually increased by 2.5 μm as the array of concave portions extends toward the center portion of the lens array in the X direction. In addition, in Example 13, the pitch of two adjacent concave portions in both end portions of the lens array was set to 1500 μm. In Example 13, the pitch was changed, step by step, by −5 μm as the array of concave portions extends toward the center portion of the lens array. That is, the pitch was gradually decreased by 5 μm as the array of concave portions extends toward the center portion of the lens array in the X direction. In Example 14, the depth of the concave portions was set to a constant value of 100 μm in a portion from one end portion to the other end portion of the lens array. In Example 14, the pitch of two adjacent concave portions was set to a constant value of 1500 µm in a portion from one end portion to the other end portion of the lens array. The machining and the tensile test were performed after the insert molding. In Example 13, the machining time was 11 seconds, and the tensile strength was 10 kg. In Example 14, the machining time was 3 seconds, and the tensile strength was 2 kg. Thus, the tensile strength of Example 13 was improved compared to the tensile strength of Example 14. In Examples 13 and 14, the optical performance was equal to that of the conventional lens array unit, and was given an evaluation of "A".

In Example 13, the machining time for the concave portions can be shortened, and the lens array unit 80C can achieve a tensile strength of 8 kg or more.

The present invention is not limited to the above-described embodiments, and can be modified within the technical concept of the present disclosure. In addition, the effects described in the embodiments are merely most effective effects produced by the present disclosure, and thus the effects of the present disclosure are not limited to those described in the embodiments.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-224282, filed Dec. 12, 2019, which is hereby incorporated by reference herein in its entirety.

What is claimed is:

1. A lens array unit comprising:
    a lens array comprising a plurality of lenses, a first side plate, and a second side plate, the plurality of lenses being arrayed in an array direction, the first side plate and the second side plate being configured to hold the plurality of lenses therebetween; and
    a frame made of resin and comprising a first supporting portion and a second supporting portion, the first supporting portion being in contact with an outside surface of the first side plate, the second supporting portion being in contact with an outside surface of the second side plate, the first supporting portion and the second supporting portion being configured to hold the lens array therebetween and support the lens array,
    wherein the outside surface of the first side plate comprises a plurality of first concave portions spaced from each other in the array direction and configured to fit with the first supporting portion.

2. The lens array unit according to claim 1, wherein a diameter of each of the plurality of first concave portions is equal to or larger than 100 µm and equal to or smaller than 1000 µm, and a depth of each of the plurality of first concave portions is equal to or larger than 50 µm and equal to or smaller than 400 µm, and
    wherein a pitch of a pair of adjacent ones of the plurality of first concave portions is equal to or larger than 300 µm and equal to or smaller than 3000 µm.

3. The lens array unit according to claim 2, wherein a first pitch of a pair of first concave portions positioned at a center portion of the first side plate in the array direction is smaller than a second pitch of a pair of first concave portions positioned at an end portion of the first side plate in the array direction.

4. The lens array unit according to claim 3, wherein the pitch of a pair of adjacent ones of the plurality of first concave portions is decreased, step by step, by a value equal to or larger than 1 µm and equal to or smaller than 5 µm, as an array of the first concave portions extends from an end portion of the first side plate toward a center portion in the array direction.

5. The lens array unit according to claim 2, wherein a first depth of a first concave portion of the plurality of first concave portions positioned at a center portion of the first side plate in the array direction is larger than a second depth of a first concave portion of the plurality of first concave portions positioned at an end portion of the first side plate in the array direction.

6. The lens array unit according to claim 5, wherein the depth of the plurality of first concave portions is increased, step by step, by a value equal to or larger than 1 µm and equal to or smaller than 5 µm, as an array of the first concave portions extends from an end portion of the first side plate toward a center portion in the array direction.

7. The lens array unit according to claim 1, wherein the outside surface of the second side plate comprises a plurality of second concave portions spaced from each other in the array direction.

8. The lens array unit according to claim 7, wherein a diameter of each of the plurality of second concave portions is equal to or larger than 100 µm and equal to or smaller than 1000 µm, and a depth of each of the plurality of second concave portions is equal to or larger than 50 µm and equal to or smaller than 400 µm, and
    wherein a pitch of a pair of adjacent ones of the plurality of second concave portions is equal to or larger than 300 µm and equal to or smaller than 3000 µm.

9. An image sensor unit comprising:
    a lens array unit comprising:
        a lens array comprising a plurality of lenses, a first side plate, and a second side plate, the plurality of lenses being arrayed in an array direction, the first side plate and the second side plate being configured to hold the plurality of lenses therebetween; and
        a frame made of resin and comprising a first supporting portion and a second supporting portion, the first supporting portion being in contact with an outside surface of the first side plate, the second supporting portion being in contact with an outside surface of the second side plate, the first supporting portion and the second supporting portion being configured to hold the lens array therebetween and support the lens array; and
    an image sensor configured to receive light focused by the lens array of the lens array unit such that an image is formed on the image sensor,
    wherein the outside surface of the first side plate comprises a plurality of first concave portions spaced from each other in the array direction and configured to fit with the first supporting portion.

10. An image reading apparatus comprising:
    a document platen on which a document is placed; and
    an image sensor unit configured to read an image of the document placed on the document platen,
    wherein an image sensor unit comprises
        a lens array unit comprising:
            a lens array comprising a plurality of lenses, a first side plate, and a second side plate, the plurality of lenses being arrayed in an array direction, the first side plate and the second side plate being configured to hold the plurality of lenses therebetween; and a frame made of resin and comprising a first supporting portion and a second supporting portion, the first supporting portion being in contact with an outside surface of the first side plate, the second supporting portion being in contact with an outside surface of the second side plate, the first supporting portion and the second supporting portion being configured to hold the lens array therebetween and support the lens array; and an image sensor configured to receive light focused by the lens array of the lens array unit such that an image is formed on the image sensor, and wherein the outside surface of the first side plate comprises a plurality of first concave portions spaced from each other in the array direction and configured to fit with the first supporting portion.

11. An image forming apparatus comprising:

an image reading apparatus; and an image forming portion configured to form an image on a recording medium in accordance with image information that is read by the image reading apparatus, wherein an image reading apparatus comprises a document platen on which a document is placed; and an image sensor unit configured to read an image of the document placed on the document platen, wherein an image sensor unit comprises a lens array unit comprising:

a lens array comprising a plurality of lenses, a first side plate, and a second side plate, the plurality of lenses being arrayed in an array direction, the first side plate and the second side plate being configured to hold the plurality of lenses therebetween; and a frame made of resin and comprising a first supporting portion and a second supporting portion, the first supporting portion being in contact with an outside surface of the first side plate, the second supporting portion being in contact with an outside surface of the second side plate, the first supporting portion and the second supporting portion being configured to hold the lens array therebetween and support the lens array; and an image sensor configured to receive light focused by the lens array of the lens array unit such that an image is formed on the image sensor, and wherein the outside surface of the first side plate comprises a plurality of first concave portions spaced from each other in the array direction and configured to fit with the first supporting portion.

12. A method of manufacturing a lens array unit, the method comprising:

forming a lens array comprising a plurality of lenses, a first side plate, and a second side plate, the plurality of lenses being arrayed in an array direction, the first side plate and the second side plate being configured to hold the plurality of lenses therebetween; and forming a frame by setting the lens array in a mold and injecting resin material into the mold, the frame comprising a first supporting portion and a second supporting portion, the first supporting portion being in contact with an outside surface of the first side plate, the second supporting portion being in contact with an outside surface of the second side plate, the first supporting portion and the second supporting portion being configured to hold the lens array therebetween and support the lens array, wherein the forming of the lens array comprises forming a plurality of first concave portions in the outside surface of the first side plate, with the plurality of first concave portions being spaced from each other in the array direction, and wherein the forming of the frame comprises forming the first supporting portion such that the first supporting portion fits in the plurality of first concave portions.

13. The method according to claim 12, wherein each of the plurality of first concave portions is formed by using a laser beam.

14. The method according to claim 12, wherein the forming of the lens array comprises forming a plurality of second concave portions in the outside surface of the second side plate, with the plurality of second concave portions being spaced from each other in the array direction.

15. The method according to claim 14, wherein each of the plurality of second concave portions is formed by using a laser beam.

* * * * *